US012262359B2

(12) United States Patent
Ding et al.

(10) Patent No.: US 12,262,359 B2
(45) Date of Patent: Mar. 25, 2025

(54) PARTIAL SENSING-BASED RESOURCE SELECTION METHOD AND USER EQUIPMENT

(71) Applicant: GUANGDONG OPPO MOBILE TELECOMMUNICATIONS CORP., LTD., Guangdong (CN)

(72) Inventors: Yi Ding, Guangdong (CN); Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/542,523

(22) Filed: Dec. 15, 2023

(65) Prior Publication Data

US 2024/0121763 A1    Apr. 11, 2024

Related U.S. Application Data

(63) Continuation of application No. 18/353,818, filed on Jul. 17, 2023, now Pat. No. 11,937,220, and a
(Continued)

(51) Int. Cl.
*H04W 72/0446* (2023.01)
*H04W 4/40* (2018.01)
(Continued)

(52) U.S. Cl.
CPC ......... *H04W 72/0446* (2013.01); *H04W 4/40* (2018.02); *H04W 28/26* (2013.01); *H04W 72/02* (2013.01); *H04W 72/25* (2023.01)

(58) Field of Classification Search
CPC . H04W 76/28; H04W 74/0816; H04W 72/02; H04W 72/0446; H04W 4/40; H04W 28/26
See application file for complete search history.

(56) References Cited

U.S. PATENT DOCUMENTS 9,210,724 B2 * 12/2015 Nagai ...................... G08G 1/16
11,265,764 B2    3/2022 Tang
(Continued)

FOREIGN PATENT DOCUMENTS

CN     109121198 A     1/2019
CN     110856270 A     2/2020
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331 V16.2.0 (Sep. 2020), pp. 420-pp. 421. 916 pages.
(Continued)

*Primary Examiner* — Raj Jain
(74) *Attorney, Agent, or Firm* — PERKINS COIE LLP

(57) ABSTRACT

A partial sensing-based resource selection method and a User Equipment are disclosed. The method includes: determining at least one selected slot and at least one sensing slot, the selected slot being after a target slot, and the sensing slot being before the target slot; and determining a candidate resource set from available resources of the selected slot on the basis of the sensing result in the sensing slot, and selecting a transmission resource from the candidate resource set.

18 Claims, 13 Drawing Sheets

Related U.S. Application Data continuation of application No. PCT/CN2021/085359, filed on Apr. 2, 2021.

(51) Int. Cl.
*H04W 28/26* (2009.01)
*H04W 72/02* (2009.01)
*H04W 72/25* (2023.01)

(56) References Cited

U.S. PATENT DOCUMENTS

| | | | | |
|---|---|---|---|---|
| 11,937,220 | B2* | 3/2024 | Ding | H04W 28/26 |
| 2020/0029245 | A1 | 1/2020 | Khoryaev | |
| 2020/0314804 | A1* | 10/2020 | Shin | H04L 5/0055 |
| 2020/0367113 | A1 | 11/2020 | Tang | |
| 2020/0367160 | A1 | 11/2020 | Braun | |
| 2021/0011147 | A1 | 1/2021 | Va | |
| 2021/0153250 | A1 | 5/2021 | Jiang | |
| 2022/0330261 | A1* | 10/2022 | Yeo | H04L 5/0053 |
| 2022/0346118 | A1* | 10/2022 | Wu | H04L 1/1825 |
| 2022/0377621 | A1 | 11/2022 | Lee | |
| 2023/0189218 | A1* | 6/2023 | Shin | H04W 72/25 370/329 |
| 2023/0217317 | A1 | 7/2023 | Zhao | |
| 2024/0032099 | A1* | 1/2024 | Hoang | H04L 1/1812 |
| 2024/0121763 | A1* | 4/2024 | Ding | H04W 72/25 |
| 2024/0172320 | A1* | 5/2024 | Ko | H04W 72/25 |

FOREIGN PATENT DOCUMENTS

| | | |
|---|---|---|
| CN | 111246426 A | 6/2020 |
| CN | 111885620 A | 11/2020 |
| CN | 112118630 A | 12/2020 |
| CN | 112153602 A | 12/2020 |
| CN | 112272397 A | 1/2021 |
| CN | 112512124 A | 3/2021 |
| JP | 2019526995 A | 9/2019 |
| JP | 2020017778 A | 1/2020 |
| WO | 2019185010 A1 | 10/2019 |

OTHER PUBLICATIONS

"3rd Generation Partnership Project; Technical Specification Group Radio Access Network; Evolved Universal Terrestrial Radio Access (E-UTRA); Physical layer procedures (Release 16)", 3GPP TS 36.213 V16.4.0 (Dec. 2020), section 14.1.1.6. 572 pages.
RAN2 Chairman (MediaTek), "Draft Chairman Notes", 3GPP TSG-RAN WG2 Meeting #114 electronic R2-2xxxxxx Online, May 17-27, 2021, section 8.15.2. 131 pages.
Vivo. "Resource allocation for sidelink power saving" 3GPP TSG RAN WG1#102-e, R1-2005403, Aug. 28, 2020 (Aug. 28, 2020), sections 2-5. 6 pages.
Vivo. "Discussion on Sidelink DRX" 3GPP TSG RAN WG1 #102-e, R1-2005405, Aug. 28, 2020 (Aug. 28, 2020), entire document. 3 pages.
International Search Report in the international application No. PCT/CN2021/100651, mailed on Mar. 16, 2022. 5 pages with English translation.
Written Opinion of the International Search Authority in the international application No. PCT/CN2021/100651, mailed on Mar. 16, 2022. 7 pages with English translation.
International Search Report in the international application No. PCT/CN2021/085359, mailed on Jan. 4, 2022. 6 pages with English translation.
English translation of the Written Opinion of the International Search Authority in the international application No. PCT/CN2021/085359, mailed on Jan. 4, 2022. 6 pages with English translation.
TCL Communication. "Resource allocation for power saving", 3GPP TSG RAN WG1 #103-e R1-2007892, Nov. 13, 2020 (Nov. 13, 2020). 8 pages.
"3rd Generation Partnership Project; Technical Specification Group Radio Access Network; NR;Physical layer procedures for data (Release 16)", 3GPP TS 38.214 V16.4.0 (Dec. 2020). 168 pages.
"UE procedures related to Sidelink", Release 16, 3GPP TS 36.213 V16.4.0 (Dec. 2020) p. 495-555. 61 pages.
Moderator (OPPO), "FL summary for AI 8.11.1.1-resource allocation for power saving", 3GPP TSG RAN WG1 #104-e, R1-2101412, e-Meeting, Jan. 25-Feb. 5, 2021. 92 pages.
"3rd Generation Partnership Project; Technical Specification Group Radio Access Network;NR;Physical layer procedures for data (Release 16)", 3GPP TS 38.214 V16.5.0 (Mar. 2021). 170 pages.
Huawei, HiSilicon, "Sidelink resource allocation to reduce power consumption", 3GPP TSG RAN WG1 Meeting #103-e R1-2007615, E-meeting, Oct. 26-Nov. 13, 2020. 7 pages.
Notice of Allowance of the U.S. Appl. No. 18/353,818, issued on Sep. 15, 2023. 14 pages.
CMCC: "Discussion on resource allocation for power saving", 3GPP Draft; R1-2008031, 3rd Generation Partnership Project (3GPP), Mobile Competence Centre; 650, Route Des Lucioles; F-06921 Sophia-Antipolis Cedex; France, vol. RAN WG1, No. e-Meeting; Oct. 26, 2020-Nov. 13, 2020, Nov. 1, 2020 (Nov. 1, 2020), XP052349389, section 2, section 2.1; figure 1. 7 pages.
Samsung: "On resource allocation for power saving", 3GPP Draft; R1-2008189, 3rd Generation Partnership Project (3GPP), Mobile Competence Centre; 650, Route Des Lucioles; F-06921 Sophia-Antipolis Cedex; France, vol. RAN WG1, No. e-Meeting; Oct. 26, 2020-Nov. 13, 2020, Nov. 1, 2020 (Nov. 1, 2020), XP052349548, section 2.2; figure 1. 4 pages.
Supplementary European Search Report in the European application No. 21934094.0, mailed on Jan. 23, 2024. 9 pages.
Corrected Notice of Allowance of the U.S. Appl. No. 18/353,818, issued on Feb. 8, 2024. 12 pages.
First Office Action of the European application No. 21934094.0, issued on Nov. 27, 2024. 6 pages.
First Office Action of the Chinese application No. 202311417499.1, issued on Jan. 17, 2025. 16 pages with English translation.
ITL, "Remain details on mode-2 resource allocation for Nr V2X", 3GPP TSG RAN WG1 #101 e-meeting R1-2004531, E-meeting, May 25-Jun. 5, 2020, pp. 1-5.
First Office Action of the Japanese application No. 2023-549110, issued on Feb. 4, 2025. 13 pages with English translation.

* cited by examiner

PARTIAL SENSING-BASED RESOURCE SELECTION METHOD AND USER EQUIPMENT

CROSS-REFERENCE TO RELATED APPLICATION

This application is a continuation application of U.S. patent application Ser. No. 18/353,818 filed on Jul. 17, 2023, which is a continuation of International Patent Application No. PCT/CN2021/085359 filed on Apr. 2, 2021. The entire content of the prior applications are incorporated by reference herein in their entirety.

BACKGROUND

In Sidelink (SL) communication, a User Equipment (UE) can select transmission resources in a resource pool by sensing.

In order to save power consumption of the UE, a partial sensing mechanism is introduced. In the partial sensing mechanism, a number of time units for resource selection and a number of time units for resource sensing are limited, so as to achieve the purpose of saving energy and power.

At present, further research is needed for a resource selection method under the partial sensing mechanism in New Radio (NR) system.

SUMMARY

Embodiments of the present disclosure relate to the technical field of communication, and in particular to a resource selection method based on partial sensing and a User Equipment.

According to one aspect of the embodiments of the present disclosure, a resource selection method based on partial sensing is provided. The method is performed by a UE, and includes the following two operations.

At least one selected slot and at least one sensing slot are determined, where the at least one selected slot is after a target slot and the at least one sensing slot is before the target slot.

According to one aspect of the embodiments of the present disclosure, a UE is provided. The UE includes a processor.

The processor is configured to determine at least one selected slot and at least one sensing slot, where the at least one selected slot is after a target slot and the at least one sensing slot is before the target slot.

The processor is further configured to determine a candidate resource set from available resources in the at least one selected slot based on a sensing result in the at least one sensing slot, and select a transmission resource from the candidate resource set.

DETAILED DESCRIPTION

In order to make the purpose, technical solution and advantages of the present disclosure clearer, embodiments of the present disclosure would be described in further detail below with reference to the accompanying drawings.

The network architecture and the service scenario described in the embodiments of the disclosure are intended to provide a clearer explanation of the technical solution of the embodiments of the disclosure, and do not constitute a limitation to the technical solution of the embodiments of the disclosure. Those skilled in the art would appreciate that the technical solution provided by the embodiments of the present disclosure is also applicable to similar technical problems with the evolution of the network architecture and the emergence of new business scenarios.

Figure 1:
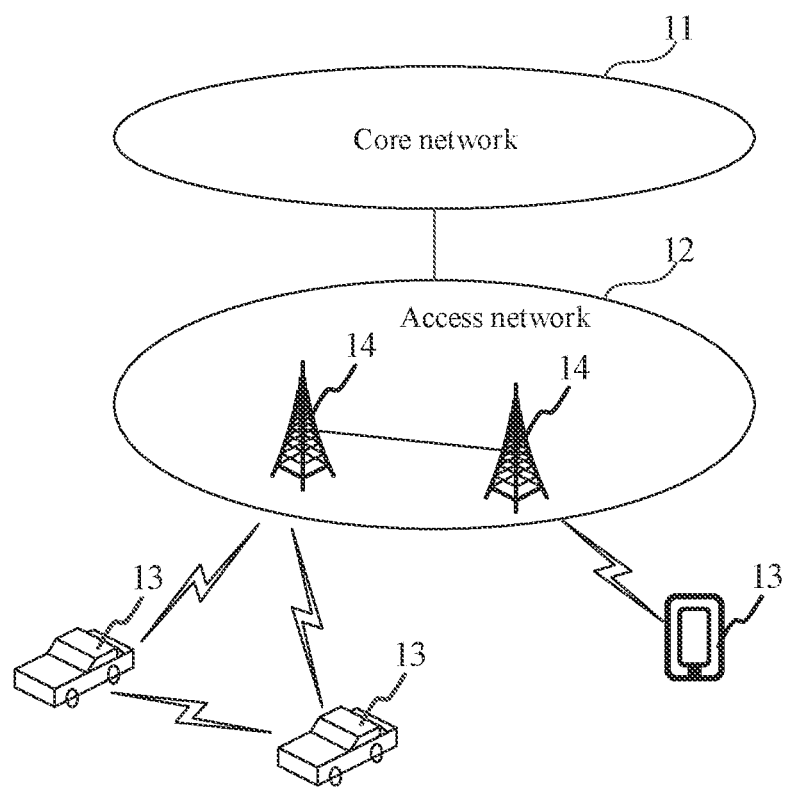
FIG. 1 is a diagram of a network architecture according to an embodiment of the present disclosure.

With reference to FIG. 1, a diagram of a network architecture according to an embodiment of the present disclosure is illustrated. The network architecture may include a core network 11, an access network 12, and a UE 13.

The core network 11 includes multiple core network devices. The function of the core network device is mainly to provide user connection, manage users, and complete the bearing of services, and is provided to an interface of an external network as a bearer network. For example, a core network of a 5th Generation (5G) New Radio (NR) system may include devices, such as an Access and Mobility Management Function (AMF) entity, a User Plane Function (UPF) entity, and a Session Management Function (SMF) entity.

The access network 12 includes multiple access network devices 14. The access network in the 5G NR system may be called a New Generation-Radio Access Network (NG-RAN). The access network device 14 is an apparatus that is deployed in the access network 12 and is configured to provide a wireless communication function for the UE 13. The access network device 14 may include various forms of macro base stations, micro base stations, relay nodes, access points, and the like. In systems using different radio access technologies, devices having the function of an access network device may have different names, for example, the devices may be called gNodeB or gNB in the 5G NR system. With the evolution of communication technologies, the name "access network device" may change. For convenience of description, in the embodiment of the present disclosure, the above-mentioned devices configured to provide a wireless communication function for the UE 13 are collectively referred to as the access network device.

There are usually multiple the UEs 13. One or more UEs 13 may be distributed within a cell managed by each access network device 14. The UEs 13 may include various handheld devices, on-board devices, wearable devices, or computing devices that have the wireless communication function, or other processing devices connected to a wireless modem, and various forms of user equipments, Mobile Stations (MS), and the like. For convenience of description, the devices mentioned above are collectively called as UE. The access network device 14 and the core network device communicate with each other via a certain in-air technology, such as an NG interface in the 5G NR system. The access network device 14 and the UE 13 communicate with each other by a certain in-air technology, such as a Uu interface.

The UEs 13 (such as an on-board device and other devices (such as other on-board devices, mobile phones, Road Side Units (RUSs), etc.)) may communicate with each other through a direct communication interface (such as a PC5 interface). Correspondingly, the communication link established on the basis of the direct communication interface may be called a direct link or an SL. SL transmission is the direct communication data transmission between UEs through the SL. Different from receiving or transmitting communication data through an access network device in a traditional cellular system, the SL transmission has the characteristics of short delay, low overhead, and the like, and is suitable for communication between two UEs that are geographically close (such as vehicle-mounted devices and other peripheral devices that are geographically close). It should be noted that in FIG. 1, only the vehicle-to-vehicle communication in vehicle to everything (V2X) scenario is taken as an example, and SL technology can be applied to the scenario where various UEs communicate with each other directly. In other words, the UE in the present disclosure is any device that uses the SL technology for communication.

The "5G NR system" in the embodiments of the disclosure may also be referred to as a 5G system or an NR system. However, those skilled in the art may understand its meaning. The technical solutions described in the embodiments of the disclosure may be applied to the 5G NR system, and may also be applied to a subsequent evolution system of the 5G NR system.

With respect to the SL transmission, 3rd Generation Partnership Project (3GPP) defines two transmission modes: Mode A and Mode B.

Mode A: transmission resources of a UE are assigned by the access network device (such as a base station). The UE transmits communication data on the SL according to the transmission resources assigned by the access network device. The access network device may not only allocate transmission resources for a single transmission to the UE, but also allocate the transmission resources for semi-static transmission to the UE.

Mode B: the UE autonomously selects transmission resources from a resource pool to transmit communication data. Specifically, the UE may select the transmission resources from the resource pool in a manner of sensing, or select the transmission resource from the resource pool in manner of random selection.

The following mainly introduces the method for the UE to autonomously select the resources for the SL communication in NR V2X system (i.e., the above Mode B).

Figure 2:
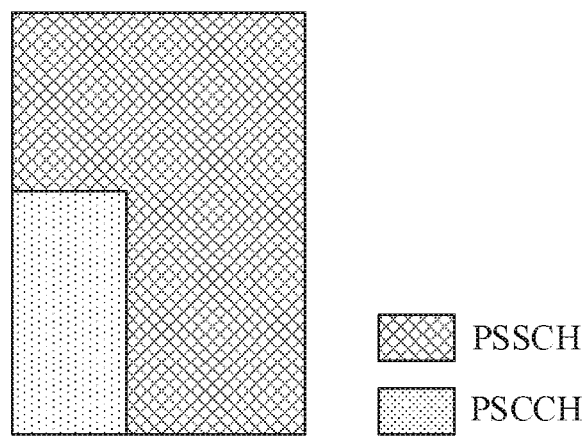
FIG. 2 is a diagram of a structure of a physical layer in SL communication according to an embodiment of the present disclosure.

A structure of a physical layer of SL communication in NR V2X system is illustrated in FIG. 2. A Physical Sidelink Control Channel (PSCCH) is configured to carry first sidelink control information, and a Physical Sidelink Shared Channel (PSSCH) is configured to carry data and second sidelink control information. The PSCCH and the PSSCH are transmitted in the same slot. The first sidelink control information and the second sidelink control information may be two pieces of sidelink control information having different functions. For example, the first sidelink control information is carried in the PSCCH and includes a domain related to resource sensing, so as to facilitate resource exclusion and resource selection by other UEs after decoding. Besides the data, the PSSCH also carries the second sidelink control information, and the second sidelink control information mainly includes a domain related to data demodulation, so as to facilitate demodulation of date in the PSSCH by other UEs.

In the NR V2X system, in Mode B, the UE autonomously selects the transmission resources to send the data. Resource reservation is the prerequisite for the resource selection.

The resource reservation means that the UE sends the first side control information in the PSCCH to reserve the resources to be used next. In NR V2X system, resource reservation within a Transport Block (TB) is supported, and resource reservation between TB s is also supported.

Figure 3:
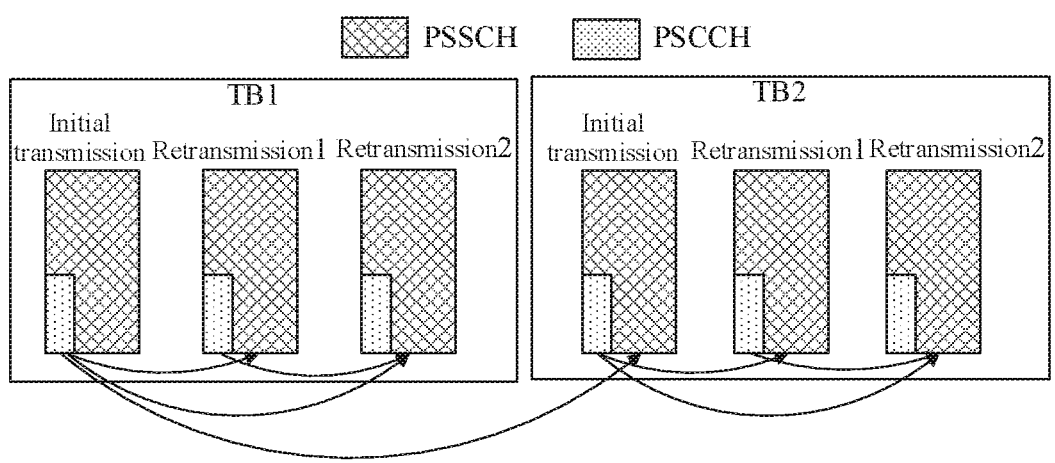
FIG. 3 is a diagram of reservation of time-frequency resource position according to an embodiment of the present disclosure.

As illustrated in FIG. 3, the UE sends the first sidelink control information, and indicates N time-frequency resources (including resources currently used for transmission) of the current TB by using a "Time resource assignment" domain and "Frequency resource assignment" domain in the first sidelink control information. N≤Nmax, and in NR V2X, Nmax equals 2 or 3. At this time, the indicated N time-frequency resources should be distributed in W slots. In NR V2X, W equals 32. For example, in the TB1 illustrated in FIG. 3, the UE sends the first sidelink control information in the PSCCH while the UE sends the data of initial transmission in the PSSCH, and time-frequency resource positions of the initial transmission and the retransmission 1 (i.e., N=2 at this time) are indicated by using the above mentioned two domains, that is, the time-frequency resource for the retransmission 1 is reserved. Moreover, the initial transmission and retransmission 1 are distributed within 32 slots in the time domain. Similarly, in the TB1 illustrated in FIG. 3, the UE indicates the time-frequency resource positions of the retransmission 1 and the retransmission 2 by using the first sidelink control information transmitted in the PSCCH of the retransmission 1, and the retransmission 1 and the retransmission 2 are distributed within 32 slots in the time domain.

At the same time, the "Resource reservation period" domain is used for the resource reservation between the TBs when the UE sends the first sidelink control information. For example, in FIG. 3, when the UE sends the first sidelink control information of the initial transmission of TB1, the time-frequency resource positions of the initial transmission of TB1 and the retransmission 1 of TB1 are indicated by using the "Time resource assignment" domain and "Frequency resource assignment" domain, and the time-frequency resource positions are denoted as $\{(t_1,f_1), (t_2,f_2)\}$.

Herein $t_1$ and $t_2$ represent positions of the initial transmission resource and retransmission 1 resource of TB1 in the time domain, and $f_1$ and $f_2$ represent the corresponding positions in the frequency domain. If a value of the "Resource reservation period" domain is 100 milliseconds in the first sidelink control information, the Sidelink Control Information (SCI) simultaneously indicates time-frequency resources $\{(t_1+100,f_1), (t_2+100,f_2)\}$ which are used for transmission of the initial transmission and the retransmission 1 of the TB2. Similarly, the first sidelink control information transmitted in retransmission 1 of TB1 also uses the "Resource reservation period" domain to reserve the time-frequency resources for retransmission 1 and retransmission 2 of TB2. In NR V2X, the value of "Resource reservation period" domain may be 0 milliseconds (ms), 1-99 ms, 100 ms, 200 ms, 300 ms, 400 ms, 500 ms, 600 ms, 700 ms, 800 ms, 900 ms and 1000 ms, which is more flexible than Long Term Evolution (LTE) V2X. However, in each resource pool, only e of the possible values are configured, and the UE determines the possible values according to the used resource pool. The e of the possible values in the resource pool configuration compose a resource reservation period set M. Exemplarily, e is less than or equal to 16.

In addition, by being configured by the network or pre-configured, the reservation between TBs can be activated or deactivated in unit of the resource pool. When the reservation between TBs is deactivated, the "Resource reservation period" domain is not included in the first sidelink control information. Generally, before the resource reselection is triggered, the value of the "Resource reservation period" domain used by the UE (i.e., the resource reservation period) would not change. Every time the UE sends the first sidelink control information, the "Resource reservation period" domain is configured to reserve the resources in the next period for the transmission of another TB, so as to achieve periodic semi-persistent transmission.

When the UE works in the Mode B, the UE can obtain the first sidelink control information sent by other UEs by sensing the PSCCH sent by other UEs, so as to acquire the resources reserved by other UEs. When the UE performs resource selection, the resources reserved by other UEs would be excluded, so as to avoid resource collision.

In the NR V2X system, the UE needs to autonomously select resources in the above Mode B.

Figure 4:
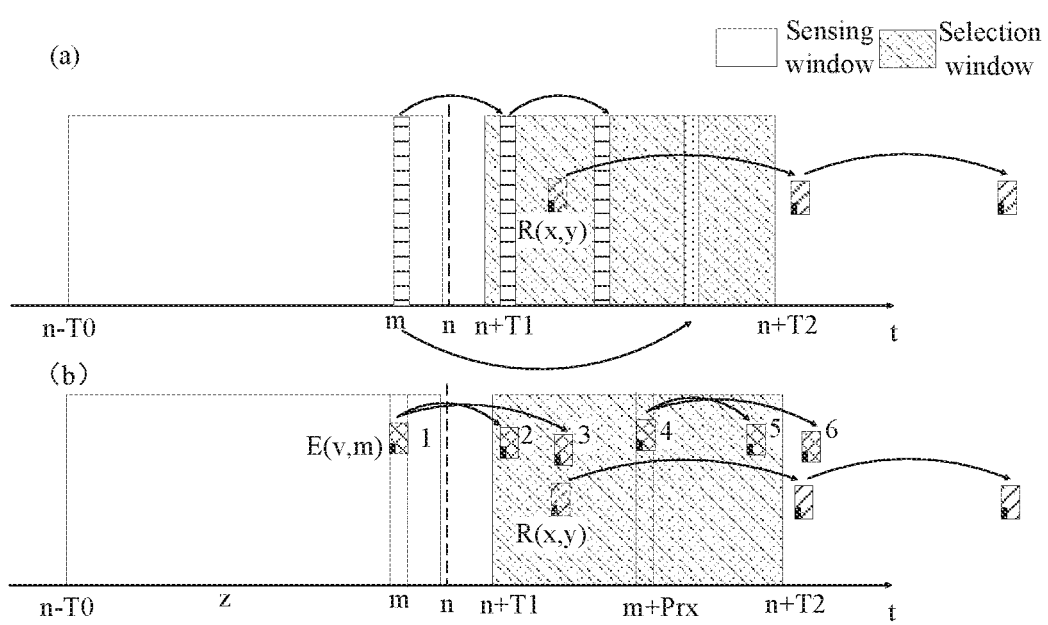
FIG. 4 is a diagram of resource sensing and resource selection according to an embodiment of the present disclosure.

As illustrated in FIG. 4, the UE triggers resource selection or resource reselection in a slot n or the slot n is a slot where the higher layer triggers a physical layer to report the candidate resource set. The resource selection window starts at n+T1 and ends at n+T2. $0<=T1<=T_{proc,1}$. When a subcarrier interval is 15 kHz, 30 kHz, 60 kHz, 120 kHz, $T_{proc,1}$ is 3 slots, 5 slots, 9 slots, 17 slots, respectively. $T2_{min}<=T2<=$ a residual delay budget of service. A set of value of $T2_{min}$ is $\{1, 5, 0, 20\}*2^\mu$ slots, and $\mu=0, 1, 2, 3$ respectively corresponds to the case where the subcarrier interval is 15 kHz, 30 kHz, 60 kHz, 120 kHz. The UE determines $T2_{min}$ from the set of value according to a priority of data to be transmitted by the UE. For example, when the subcarrier interval is 15 kHz, the UE determines $T2_{min}$ from the set $\{1, 5, 10, 20\}$ according to the priority of data to be transmitted. When $T2_{min}$ is greater than or equal to the residual delay budget of service, T2 is equal to the residual delay budget of service. The residual delay budget is a difference between a moment corresponding to a data delay requirement and a current moment. For example, for a packet arriving at slot n, the delay requirement is 50 ms. Assuming that a slot is 1 ms, if the current moment is slot n, the residual delay budget is 50 ms, and if the current time is slot n+20, the residual delay budget is 30 ms.

The UE performs resource sensing between n-T0 and n-$T_{proc,0}$, and the value of T0 is 100 ms or 1100 ms. When the subcarrier interval is 15 kHz, 30 kHz, 60 kHz, 120 kHz, $T_{proc,0}$ is 1 slot, 1 slot, 2 slots, 4 slots, respectively. In fact, the UE would sense the first sidelink control information sent by other UEs in each slot (except its own transmission slot). When the resource selection or the resource reselection is triggered at slot n, the UE uses the results of resource sensing between n-T0 and n-$T_{proc,0}$.

In Step 1, The UE takes all available resources belonging to the resource pool used by the UE in the resource selection window as a resource set A. Any resource in the set A is denoted as R(x,y), and x and y respectively indicate the position of the resource in frequency domain and the position of the resource in time domain. A initial number of resources in set A is denoted as $M_{total}$. The UE excludes the resources in the resource set A according to the slot (Step 1-1) not being sensed in a resource sensing window and/or a result of the resource sensing (Step 1-2) in the resource sensing window. The UE determines whether the resource R(x,y) or a series of periodic resources corresponding to the resource R(x,y) overlaps with a slot determined according to the slot not being sensed in Step 1-1 or a resource determined according to the first sidelink control information sensed in Step 1-2, and if there is an overlap, the resource R(x,y) is excluded from the resource set A.

In Step 1-1, if the UE sends data at slot m in the sensing window without sensing, the UE would determine corresponding Q slots based on the slot m and each allowed resource reservation period in the resource pool used by the UE by taking the resource reservation period as an interval. If the Q slots overlap with the resource R(x,y) or with the series of periodic resources corresponding to the resource R(x,y), the resource R(x,y) is excluded from the resource set A. Q=1 or Q=$\lceil$Tscal/Prx$\rceil$ (representing rounding up). Tscal is a value in millisecond converted from T2. Prx is one of the resource reservation periods allowed by the resource pool used by the UE.

For example, as illustrated in the subfigure (a) in FIG. 4, The UE does not perform the sensing at slot m, the resource exclusion is performed sequentially according to each resource reservation period in the resource reservation period set M in the resource pool configuration used by the UE. For a certain resource reservation period 1, assuming that the value of Q is calculated to be 2, the corresponding Q slots are the next two slots mapped from the slot m with the resource reservation period 1 as the interval, and the next two slots are marked by horizontal shading in the subfigure (a) of FIG. 4. For a certain resource reservation periods 2, assuming that the value of Q is calculated to be 1, the corresponding Q slot is a slot mapped from the slot m with the resource reservation period 2 as the interval, and the slot is marked by the dot in the subfigure (a) of FIG. 4.

The UE would determine whether Q slots respectively corresponding to each reservation period overlap with the resource R(x,y) or the series of periodic resources corresponding to the resource R(x,y), and if there is an overlap, the resource R(x,y) is excluded from the resource set A.

Alternatively, the UE may not perform the above Step 1-1 when the resource pool used by the UE deactivates the reservation between TBs.

In Step 1-2, If the first sidelink control information transmitted in the PSCCH is sensed by the UE in the slot m in the resource sensing window, a Sidelink Reference Signal Received Power (SL-RSRP) of the PSCCH is measured, or a SL-RSRP of the PSSCH scheduled by the PSCCH (i.e., the SL-RSRP of the PSSCH transmitted in the same slot as the PSCCH) is measured.

If the measured SL-RSRP is greater than a SL-RSRP threshold, and the resource pool used by the UE activates the resource reservation between TBs, the UE would determine the corresponding Q slots based on the slot m and the resource reservation period carried in the sensed first sidelink control information by taking the resource reservation period as an interval. It is assumed that the UE receives the first sidelink control information having the same content in the Q slots. The UE determines whether the resources indicated by the "Time resource assignment" domains and "Frequency resource assignment" domains of the first sidelink control information received in the slot m and the Q pieces of first sidelink control information that are assumed to be received overlap with the resource R(x,y) or the series of periodic resources corresponding to the resource R(x,y). If there is an overlap, the corresponding resource R(x,y) is excluded from the set A. Q=1 or Q=⌈Tscal/Prx⌉ (representing rounding up). Tscal is a value in millisecond converted from T2. Prx is a resource reservation period carried in the sensed first sidelink control information.

For example, as illustrated in subfigure (b) in FIG. 4, when the resource pool used by the UE activates the reservation between TBs, if the first sidelink control information in the PSCCH is sensed by the UE on the resource E(v,m) of the slot m, the resource reservation period in the first sidelink control information is Prx. It is assumed that the value of Q is calculated to be 1, the UE would assume that the first sidelink control information having the same content is received in the slot m+Prx. The UE would determine whether the resource 1, resource 2, resource 3, resource 4, resource 5 and resource 6 indicated in the "Time resource assignment" domains and "Frequency resource assignment" domains of the first sidelink control information received at slot m and the first sidelink control information that is assumed to be received at slot m+Prx overlap with the resource R(x,y) or the series of periodic resources corresponding to the resource R(x,y). The resource R(x,y) would be excluded from the resource set A if there is an overlap and a Reference Signal Received Power (RSRP) condition is met.

If the SL-RSRP measured by the UE is greater than the SL-RSRP threshold and the resource pool used by the UE deactivates the resource reservation between TBs, the UE only determines whether the resources indicated by the "Time resource assignment" domain and "Frequency resource assignment" domain of the first sidelink control information received in the slot m overlap with the resource R(x,y) or the series of resources corresponding to the resource R(x,y). If there is an overlap, the resource R(x,y) is excluded from the resource set A.

For example, as illustrated in subfigure (b) in FIG. 4, when the resource pool used by the UE deactivates the reservation between TBs, if the first sidelink control information in the PSCCH is sensed on the resource E(v,m) of the slot m, the UE determines whether the resource 1, resource 2 and resource 3 indicated by the "Time resource assignment" domain and "Frequency resource assignment" domain of the first sidelink control information overlap with the resource R(x,y) or the series of periodic resources corresponding to the resource R(x,y). The resource R(x,y) is excluded from the resource set A if there is an overlap and the RSRP condition is met.

If residual resources in the resource set A are less than $M_{total}*X$ % after the above resource exclusion, the SL-RSRP threshold is raised by 3 dB, and the Step 1 is performed again. The physical layer takes the resource set A subjected to the resource exclusion as a candidate resource set and reports the candidate resource set to the higher layer.

In Step 2, the higher layer randomly selects resources from the reported candidate resource set to send data. That is, the UE randomly selects resources from the candidate resource set to send data.

The following three points should be noted.

1. The RSRP threshold is determined by the priority P1 carried in the PSCCH sensed by the UE and the priority P2 of the data to be sent by the UE. The resource pool configuration used by the UE includes an SL-RSRP threshold table containing SL-RSRP thresholds corresponding to combinations of all the priorities. The resource pool configuration can be configured by the network or pre-configured.

For example, as illustrated in Table 1, it is assumed that the optional values of the priority P1 and the priority P2 are both 0-7, the SL-RSRP thresholds corresponding to different combinations of the priorities are represented by $\gamma_{ij}$. Herein i in $\gamma_{ij}$ is a value of the priority P1 and j is a value of the priority P2.

TABLE 1

SL-RSRP Threshold Table

| P1 | P2 | | | | | | | |
|---|---|---|---|---|---|---|---|---|
| | 0 | 1 | 2 | 3 | 4 | 5 | 6 | 7 |
| 0 | $\gamma_{00}$ | $\gamma_{01}$ | $\gamma_{02}$ | $\gamma_{03}$ | $\gamma_{04}$ | $\gamma_{05}$ | $\gamma_{06}$ | $\gamma_{07}$ |
| 1 | $\gamma_{10}$ | $\gamma_{11}$ | $\gamma_{12}$ | $\gamma_{13}$ | $\gamma_{14}$ | $\gamma_{15}$ | $\gamma_{16}$ | $\gamma_{17}$ |
| 2 | $\gamma_{20}$ | $\gamma_{21}$ | $\gamma_{22}$ | $\gamma_{23}$ | $\gamma_{24}$ | $\gamma_{25}$ | $\gamma_{26}$ | $\gamma_{27}$ |
| 3 | $\gamma_{30}$ | $\gamma_{31}$ | $\gamma_{32}$ | $\gamma_{33}$ | $\gamma_{34}$ | $\gamma_{35}$ | $\gamma_{36}$ | $\gamma_{37}$ |
| 4 | $\gamma_{40}$ | $\gamma_{41}$ | $\gamma_{42}$ | $\gamma_{43}$ | $\gamma_{44}$ | $\gamma_{45}$ | $\gamma_{46}$ | $\gamma_{47}$ |
| 5 | $\gamma_{50}$ | $\gamma_{51}$ | $\gamma_{52}$ | $\gamma_{53}$ | $\gamma_{54}$ | $\gamma_{55}$ | $\gamma_{56}$ | $\gamma_{57}$ |
| 6 | $\gamma_{60}$ | $\gamma_{61}$ | $\gamma_{62}$ | $\gamma_{63}$ | $\gamma_{64}$ | $\gamma_{65}$ | $\gamma_{66}$ | $\gamma_{67}$ |
| 7 | $\gamma_{70}$ | $\gamma_{71}$ | $\gamma_{72}$ | $\gamma_{73}$ | $\gamma_{74}$ | $\gamma_{75}$ | $\gamma_{76}$ | $\gamma_{77}$ |

When the PSCCH sent by other UE is sensed by the UE, the UE acquires the priority P1 carried in the first sidelink control information in the PSCCH and the priority P2 of the data to be sent. The UE determines the SL-RSRP threshold by querying the Table 1.

2. Whether the measured PSCCH-RSRP or the PSSCH-RSRP scheduled by the PSCCH is used by the UE for comparison with the SL-RSRP threshold depends on the resource pool configuration of the resource pool used by the UE. The resource pool configuration can be configured by the network or pre-configured.

3. Possible values for X in X % mentioned above may be {20, 35, 50}. The resource pool configuration used by the UE includes the corresponding relationship between the priorities and the possible values. The UE determines the value of X according to the priority of the data to be sent and the corresponding relationship. The resource pool configuration can be configured by the network or pre-configured.

A SL communication mode in NR-V2X is introduced above. In the SL communication mode, the UE autonomously selects transmission resources through resource sensing and transmits data on the sidelink. The SL communication mode can also be applied to various SL communications such as direct communication between handheld terminals, and direct communication between pedestrians and vehicles.

The method in which the UE autonomously selects transmission resources through resource sensing described above does not consider saving power consumption. The resource selection method based on partial sensing is an energy-saving and power-saving resource selection method designed for power-sensitive terminals such as handheld terminals. The resource selection method based on partial sensing mainly limits the number of time units for resource selection and the number of time units for resource sensing to achieve the purpose of saving energy and power.

The resource selection method based on partial sensing for SL communication in LTE-V2X would be explained with reference to FIG. 5. The partial sensing means that the UE determines the subframe to be sensed in the resource sensing window according to at least Y subframes determined in the resource selection window and the sensing bitmap in the resource pool configuration. When resources selection is performed, the resource exclusion is performed on the resources in the at least Y subframes according to the sensing result in the subframes determined in the resource sensing window, and a resource is selected from the resources that are not excluded to send data. It should be noted that the above determination of the at least Y subframes depends on the implementation of the UE, and Y should be greater than or equal to the configuration parameter minNumCandidateSF of the resource pool used by the UE. In addition, a length of the sensing bitmap is 10 bits. The configuration parameter minNumCandidateSF represents a minimum number of candidate subframes.

Figure 5:
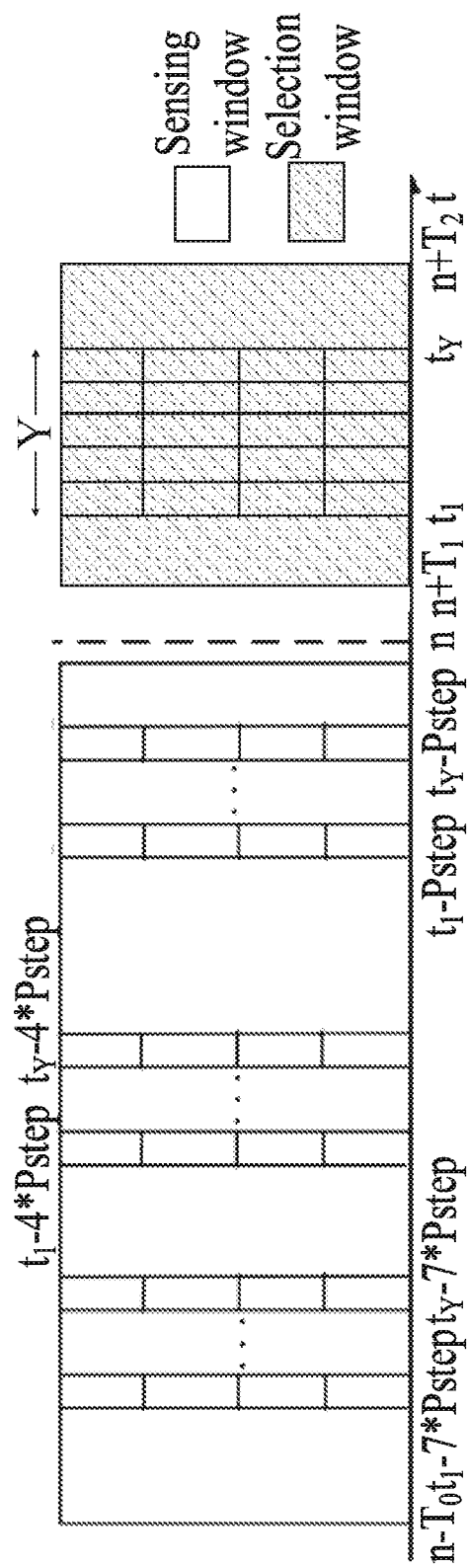
FIG. 5 is a diagram of a resource selection based on partial sensing according to an embodiment of the present disclosure.

For example, in FIG. 5, it is assumed that the UE determines Y subframes (i.e., $t_1$ to $t_Y$) in the resource selection window, and the sensing bitmap in the resource pool configuration used by the UE is $(1001001000)_2$. Because the 1st bit, the $4^{th}$ bit, and the 7th bit in the bitmap are 1, the UE should sense the SCIs sent by other UEs in subframe $t_1$-Pstep to $t_Y$-Pstep, subframe $t_1$-4*Pstep to $t_Y$-4*Pstep, and subframe $t_1$-7*Pstep to $t_Y$-7*Pstep within the resource sensing window. In most cases, for example, when the frequency band used by the UE is the V2X specified frequency band or when the UE multiplexes the frequency band used by the Frequency Division Duplexing (FDD) cellular communication system, the above Pstep is 100 ms. If the UE multiplexes the frequency band used by Time Division Duplexing (TDD) cellular system, Pstep should be adjusted according to the ratio of uplink subframes and downlink subframes. When the UE triggers resource selection or resource reselection at moment n, the UE would exclude the resources in the Y subframes according to the sensing result within the determined subframe in the resource sensing window, and finally select resources from the residual resources in the Y subframes to send data.

It should be noted that the above mechanism is suitable for the case where the moment n for triggering the resource selection or the resource reselection can be predicted. For example, the UE predicts that the next resource reselection may occur at moment n, determines the corresponding Y subframes, and determines the corresponding sensing subframe according to the Y subframes. Sensing is performed when the time reaches the sensing subframes, and the resource selection or the resource reselection is triggered when the time reaches the moment n so that the resources can be selected from the Y subframes according to the sensing result.

The resource selection mechanism based on partial sensing for NR SL transmission is currently being discussed in standardization, which starts with the above described resource selection mechanism based on partial sensing for SL transmission in LTE V2X. In LTE V2X, a maximum value of T2 is 100 ms. For any subframe y1 of determined at least Y subframes, the maximum value of the sensing subframe determined according to the subframe is y1-Pstep in the time domain. Pstep is also 100 ms. Therefore, the case that the determined sensing subframe is after the moment n would not happen.

However, in NR SL, the maximum value of T2 is the residual delay budget of service. For any one slot y1 of determined at least Y slots, when the corresponding sensing slot is determined according to the slot y1, it is also necessary to design a corresponding mechanism to ensure that the determined sensing slot would not be after slot n. Otherwise, assuming that the determined at least one sensing slot y-P1 is after the slot n, the resource selection would be triggered in the slot n, but there are still slots not having been sensed at this time. Therefore, the reliability of the resource selection would be affected. This problem is more obvious when the residual delay budget of service is large.

According to the present disclosure, during the resource selection process based on partial sensing, the positions of the selected slot and the sensing slot are determined, the selected slot is after a target moment and the sensing slot is before the target moment. In this way it can be ensured that there would be no slot not having sensed when the candidate resource set for data transmission is determined from the available resources in the selected slot, thereby ensuring the accuracy and reliability of the resource selection.

The technical solutions of the present disclosure would be described below by several embodiments.

Figure 6:
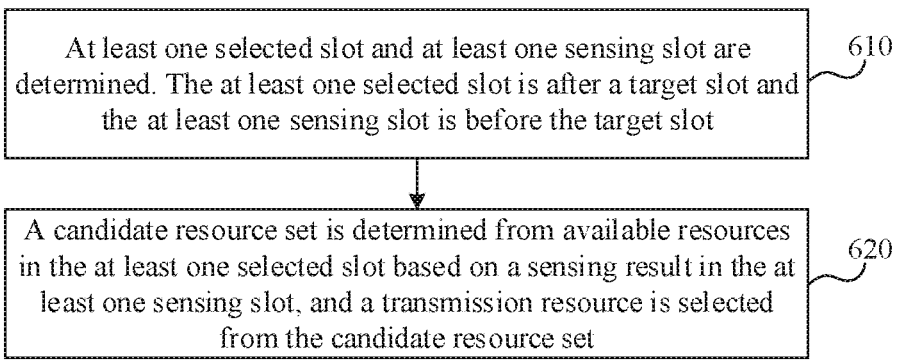
FIG. 6 is a flowchart of a resource selection method based on partial sensing according to an embodiment of the present disclosure.

With reference to FIG. 6, a flowchart of a resource selection method based on partial sensing according to an embodiment of the present disclosure is illustrated. The method may be applied to the network architecture illustrated in FIG. 1, for example, the method may be performed by a UE. The method includes operations 610 to 620.

In operation 610, at least one selected slot and at least one sensing slot are determined. The at least one selected slot is after a target moment and the at least one sensing slot is before the target moment.

Alternatively, the UE determines the at least one selected slot from a resource selection window. In one example, it is assumed that the target moment is denoted as n; a starting moment of the resource selection window may be denoted as n+T1, and the ending moment of the resource selection window may be denoted as n+T2. T1 and T2 may be determined by using the method described above. In another example, it is assumed that a moment to trigger a resource selection, or to trigger a resource reselection, or when a high layer triggers a physical layer to report the candidate resource set is denoted as n, the starting moment of the resource selection window may be represented as n+T1, and the ending moment of the resource selection window may be represented as n+T2. T1 and T2 can be determined in the method described above.

Alternatively, when the UE predicts that resource selection or resource reselection would be triggered at a target moment n or that the high layer triggers the physical layer to report the candidate resource set at the target moment n, the UE determines the resource selection window ranging from n+T1 to n+T2, and the at least one selected slot is determined from the resource selection window.

Alternatively, a number of the at least one selected slot determined above is greater than or equal to a number threshold. In an embodiment, the number of the at least one selected slot determined above is greater than or equal to Y, and Y is greater than or equal to the number threshold. The number threshold is configured by the network device, or pre-configured, or predefined in the communication protocol, or determined by the UE itself.

Alternatively, the at least one selected slot determined above is continuous or discontinuous. For example, in a case where the number of the determined at least one selected slot is multiple (i.e., the number of the determined at least one selected slot is greater than or equal to 2), the multiple selected slots may be continuous (i.e. there are no intermediate slots between any set of selected slots adjacent to each other), or the multiple selected slots may also be discontinuous slots (i.e. there are at least one set of selected slots adjacent to each other with intermediate slots between the selected slots). The set of selected slots adjacent to each other means that multiple selected slots are arranged according to the time sequence in the time domain, and the i-th selected slot and the i+1th selected slot are a set of selected slots adjacent to each other. Herein i is a positive integer.

Alternatively, the UE determines at least one sensing slot based on the determined at least one selected slot and a resource reservation period set in a resource configuration pool, and ensures that each of the determined at least one sensing slot is before the target moment.

Alternatively, the target moment is any of: a moment to trigger the resource selection, a moment to trigger the resource reselection, a moment when the high layer triggers the physical layer to report the candidate resource set, a moment to trigger the determination of the candidate resource set, a moment when the candidate resource set is determined or a moment when the physical layer reports the candidate resource set to the higher layer.

In an exemplary embodiment, the UE may determine at least one selection time unit and at least one sensing time unit. The selection time unit is after the target moment and the sensing time unit is before the target moment. Alternatively, each of the at least one selection time unit determined by the UE is after the target moment; and/or, each of the at least one sensing time unit determined by the UE is before the target moment. The time unit may be any one of time domain measurement units that include but are not limited to any one of a frame, a subframe, a slot, or a subslot.

In addition, the target moment mentioned in the present disclosure may be a time point or may be a time unit to which the time point corresponding to the target moment belongs. For example, if the time unit may be a slot, the target moment may be the slot to which the time point corresponding to the target moment belongs. For example, the slot may be referred to as the target slot.

It should be noted that the A time unit/moment is before the B time unit/moment mentioned in the disclosure, which means that the A time unit/moment is less than or equal to the B time unit/moment. Accordingly, the A time unit/moment is after the B time unit/moment, which means that the A time unit/moment is greater than or equal to the B time unit/moment. For example, the at least one selected slot is after the target moment as described above, which means that the at least one selected slot is greater than or equal to the target moment. The at least one sensing slot is before the target moment as described above, which means that the at least one sensing slot is less than or equal to the target moment. Description of the sequence of two time units/moments elsewhere in the present disclosure follows the explanation herein and would not be repeated elsewhere.

In operation 620, a candidate resource set is determined from available resources in the at least one selected slot based on a sensing result in the at least one sensing slot, and a transmission resource is selected from the candidate resource set.

Alternatively, the UE performs resource exclusion on the available resources in the determined at least one selected slot based on the sensing result in the determined at least one sensing slot, constructs a set of candidate resources, and selects transmission resources from the set of candidate resources to transmit data.

To sum up, according to the technical solution provided by the embodiments of the disclosure, during the resource selection process based on partial sensing, the positions of the at least one selected slot and the at least one sensing slot are determined; the at least one selected slot is after a target moment and the at least one sensing slot is before the target moment. In this way it can be ensured that there would be no slot not having been sensed when the candidate resource set for data transmission is determined from the available resources in the at least one selected slot, thereby ensuring the accuracy and reliability of the resource selection.

In an exemplary embodiment, the UE determines the at least one selected slot and at least one sensing slot through the following operations. The at least one selected slot is determined from a resource selection window. For any one of the at least one selected slot, a target candidate slot corresponding to the selected slot is determined as one of the at least one sensing slot. The target candidate slot is before a first moment. An interval between the target candidate slot and the selected slot is an integer multiple of a resource reservation period, and the first moment is determined based on the target moment.

Alternatively, the interval between the target candidate slot and the at least one selected slot is i times the resource reservation period, and i is a smallest positive integer to make the target candidate slot to be before the first moment.

Alternatively, for any one of the determined at least one selected slot ty, the sensing slot determined according to ty is ty-Px. Px is all values of the resource reservation period set in the resource pool configuration. For a certain Px, if ty-Px is greater than or equal to the first moment, the sensing slot is ty-i*Px, and i is the smallest positive integer satisfying that ty-i*Px is less than or equal to the first moment. If ty-Px is less than or equal to the first moment, the sensing slot is ty-Px.

Alternatively, the first moment is the target moment, or the first moment is the target moment minus a first offset. Alternatively, the first offset is determined from multiple candidate offsets based on a subcarrier interval. For example, the first offset is $T_{proc,0}$ or $T_{proc,1}$. Explanation about $T_{proc,0}$ and $T_{proc,1}$ can refer to the description mentioned above. In addition, the first moment may also be a time point or a time unit to which the time point corresponding to the first moment belongs. For example, in the case where the target moment is the target slot n, assuming that the first moment is denoted as the first slot A, the first slot A may be the target slot n or may be the target slot n minus the first offset.

Figure 7:
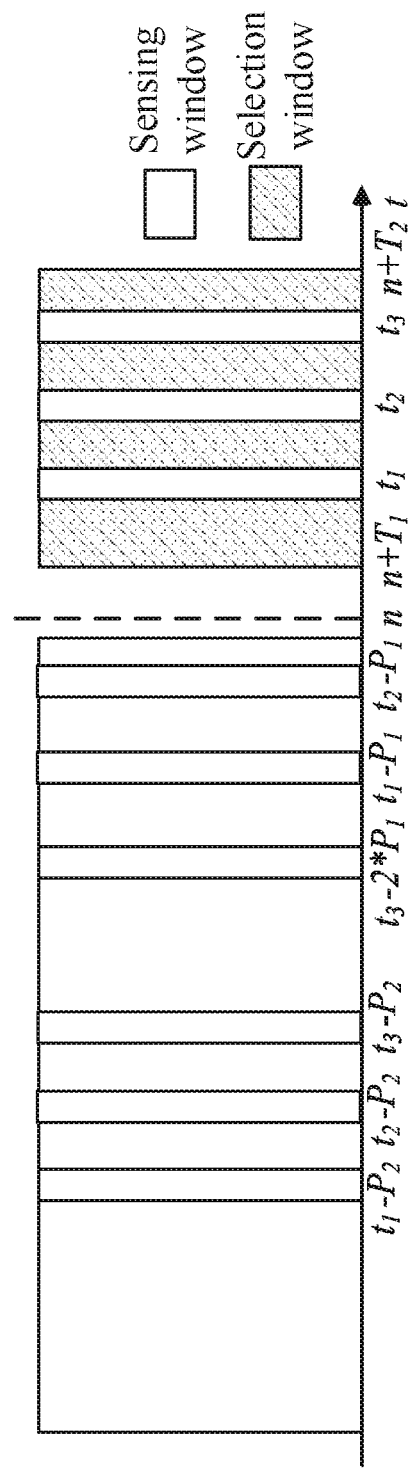
FIG. 7 is a diagram of determining a selected slot and a sensing slot according to an embodiment of the present disclosure.

Exemplarily, as illustrated in FIG. 7, if the selected slots determined by the UE are t1, t2, and t3, and the values of the resource reservation period set in the resource pool configuration are P1 and P2, the sensing slots determined according to t1 and t2 are t1-P1, t1-P2, t2-P1, and t2-P2. Since t3-P1 is larger than the target slot n, the sensing slots determined according to t3 are t3-2*P1 and t3-P2.

In the embodiment, by controlling the position of the at least one sensing slot, the determined at least one sensing slot is before the target moment, which can ensure that when the resource exclusion is performed on the available resources in the at least one selected slot to construct the candidate resource set for data transmission, there would be no slot not having been sensed, thereby ensuring the accuracy and reliability of the resource selection.

In another embodiment, the UE determines the at least one selected slot and the at least one sensing slot through the following operations. A maximum threshold of the at least one selected slot is determined based on the target moment. Herein the at least one selected slot from a resource selection window is determined based on the maximum threshold. The at least one selected slot is before the maximum threshold. The at least one sensing slot is determined based on the at least one selected slot and a resource reservation period.

In one example, the UE adds the target moment and a second offset to obtain the maximum threshold of the at least one selected slot.

In another example, the UE adds a first moment and a second offset to obtain the maximum threshold of the at least one selected slot, and the first moment is determined based on the target moment. Alternatively, the first moment is the target moment minus a first offset.

Alternatively, the second offset is determined based on a minimum value in a resource reservation period set in a resource pool configuration (e.g., the second offset may be a minimum value in the resource reservation period set in the resource pool configuration or the second offset may be an integer multiple of the minimum value). Alternatively, the second offset is determined based on a minimum value of resource reservation periods in a resource pool used by the UE (e.g., the second offset may be a minimum value of the resource reservation periods in the resource pool used by the UE, or the second offset may be an integer multiple of the minimum value). Alternatively, the second offset is configured by a network device, or the second offset is pre-configured.

Alternatively, the first offset is determined from multiple candidate offsets based on a subcarrier interval. For example, the first offset is $T_{proc,0}$ or $T_{proc,1}$. Explanation about $T_{proc,0}$ and $T_{proc,1}$ can refer to the description mentioned above.

Alternatively, in a case where the UE determines the at least one selected slot in the above manner and ensures that the determined at least one selected slot is before the maximum threshold, the UE subtracts an integer multiple of the resource reservation period from the determined at least one selected slot to obtain the at least one sensing slot. For example, the UE may subtract the resource reservation period from the determined at least one selected slot to obtain at least one sensing slot, or may subtract k times the resource reservation period from the determined at least one selected slot to obtain the at least one sensing slot. Herein k is an integer greater than 1. Exemplarily, in a case where the second offset is the minimum value in the resource reservation period set in the resource pool configuration or the second offset is the minimum value of the resource reservation periods in the resource pool used by the UE, the UE may subtract the resource reservation period from the determined at least one selected slot to obtain the at least one sensing slot. Alternatively, in a case where the second offset is k times the minimum value in the resource reservation period set in the resource pool configuration, or k times the minimum value of the resource reservation periods in the resource pool used by the UE, or the second offset is configured by the network device or pre-configured, the UE can subtract k times the resource reservation period from the determined at least one selected slot to obtain the at least one sensing slot.

Alternatively, the at least one selected slot determined by the UE within the resource selection window should be less than or equal to the maximum threshold. For example, if the target moment is the target slot n, the at least one selected slot determined by the UE in the resource selection window should be less than or equal to the slot n+W, and W is the second offset described above. W may be determined according to the minimum value in the resource reservation period set in the resource pool configuration, or W may be determined by the minimum value of the resource reservation periods in the resource pool used by the UE, or W may be configured by the network device or pre-configured. For a certain determined selected slot ty, the sensing slot determined by the UE according to ty is ty-Px. Px may be all values in the resource reservation period set in the resource pool configuration. Alternatively, for a certain determined selected slot ty, the sensing slot determined by the UE according to ty is ty-k*Px. Px may be all values in the resource reserved period set in the resource pool configuration, and k may be a positive integer or may be the smallest positive integer that makes ty-k*Px to be before the target moment.

Figure 8:
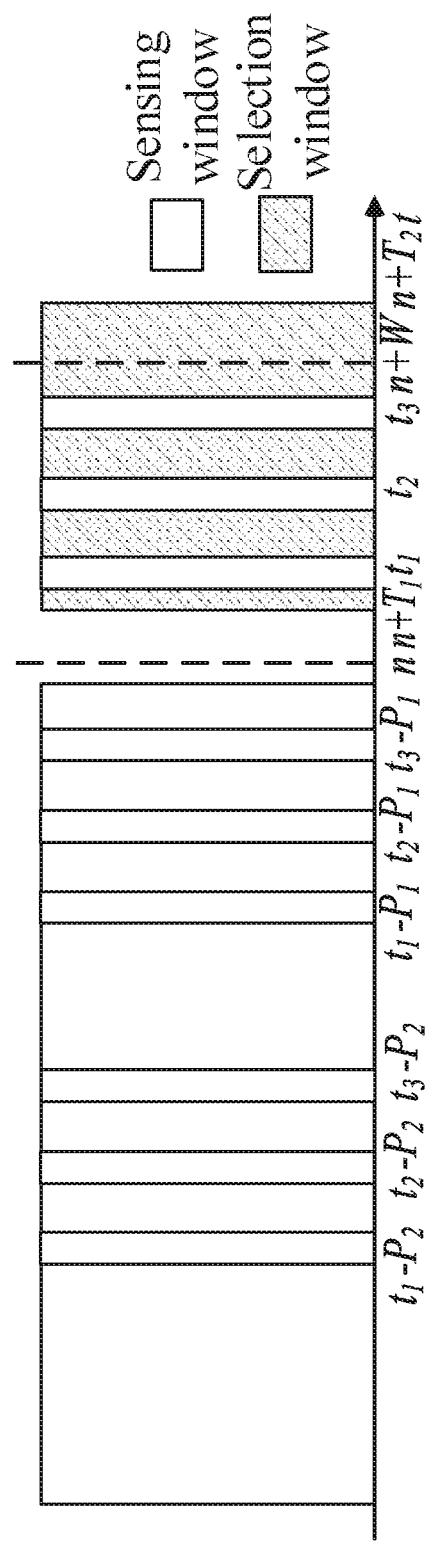
FIG. 8 is a diagram of determining a selected slot and a sensing slot according to another embodiment of the present disclosure.

Exemplarily, as illustrated in FIG. 8, the selected slots determined by the UE are t1, t2, and t3; the values in the resource reservation period set in the resource pool configuration are P1 and P2, and the minimum value in the resource reservation period set is P1. The selected slots t1, t2, and t3 determined by the UE are all smaller than the slot n+W, and W is equal to P1. It is ensured that the sensing slots t1-P1, t2-P1, t3-P1, t1-P2, t2-P2 and t3-P2 determined by the UE are all before the target slot n.

In the embodiment, by controlling the maximum threshold of the at least one selected slot, the determined at least one selected slot is before the maximum threshold, and the at least one sensing slot determined based on the at least one selected slot and the resource reservation period is before the target moment, which can ensure that when the resource exclusion is performed on the available resources in the at least one selected slot to construct the candidate resource set for data transmission, there would be no slot not having been sensed, thereby ensuring the accuracy and reliability of the resource selection.

In another embodiment, the UE determines the at least one selected slot and the at least one sensing slot through the following operations. The at least one selected slot are determined from the resource selection window. The at least one sensing slot is determined based on the at least one selected slot and the resource reservation period. Position of the target moment includes at least one of being after a last one of the at least one sensing slot or being before a first one of the at least one selected slot.

Alternatively, for any one of the determined at least one selected slot ty, the sensing slot determined according to ty is ty-Px. Px may be all values in the resource reservation period set in the resource pool configuration. The target moment is greater than or equal to the last one (i.e., the largest in the time domain) of the at least one sensing slot determined by the UE and/or less than or equal to the first one (i.e., smallest in the time domain) of the at least one selected slot determined by the UE.

Alternatively, for any one of the determined at least one selected slot ty, the sensing slot determined according to ty is ty-k*Px. Px may be all values in the resource reservation period set in the resource pool configuration, and k is a positive integer. The target moment is greater than or equal to the last one (i.e., the largest in the time domain) of the at least one sensing slot determined by the UE and/or less than or equal to the first one (i.e., smallest in the time domain) of the at least one selected slot determined by the UE.

Alternatively, the target moment is the first one of the at least one selected slot minus a third offset. Alternatively the third offset is determined from multiple candidate offsets based on a subcarrier interval. For example, the third offset is $T_{proc,0}$ or $T_{proc,1}$. Explanation about $T_{proc,0}$ and $T_{proc,1}$ can refer to the description mentioned above.

Alternatively, the UE continues sensing in the determined at least one sensing slot between a second moment and a third moment. The second moment is any one of the moment to trigger the resource selection, the moment to trigger the resource reselection, or the moment when the high layer triggers the physical layer to report the candidate resource set, and the third moment is any one of the moment to trigger the determination of the candidate resource set, the moment when the candidate resource set is determined, or the moment when the physical layer reports the candidate resource set to the higher layer.

Figure 9:
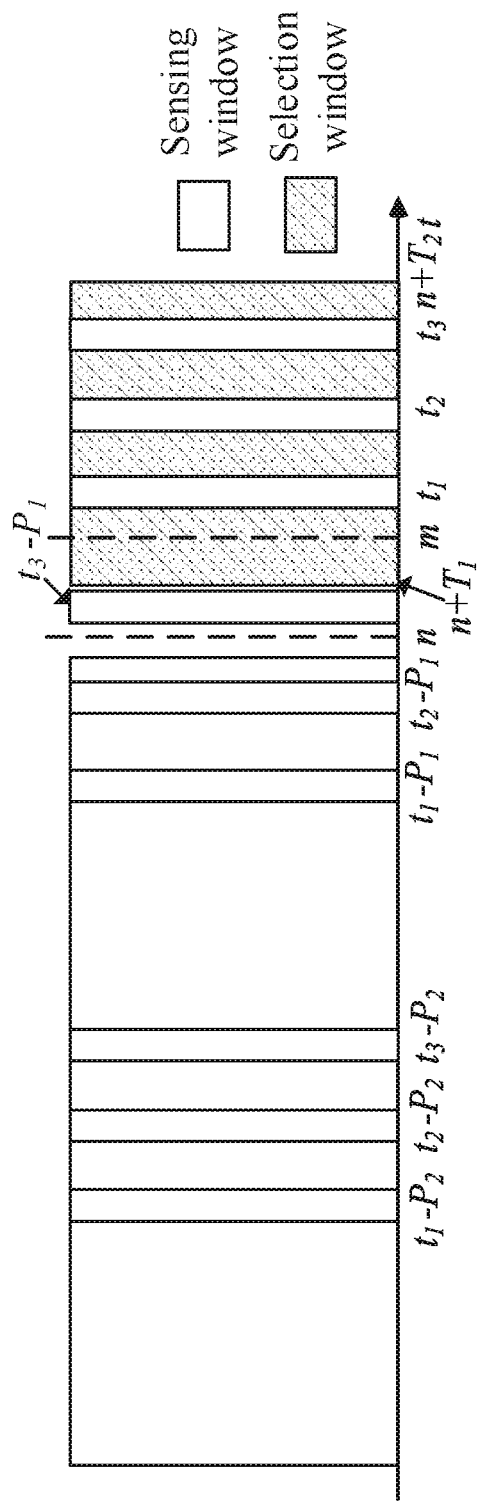
FIG. 9 is a diagram of determining a selected slot and a sensing slot according to yet another embodiment of the present disclosure.

Exemplarily, as illustrated in FIG. 9, the at least one selected slots determined by the UE are t1, t2, and t3, and the sensing slots determined by the UE are t1-P1, t2-P1, t3-P1, t1-P2, t2-P2, and t3-P2. In the target slot n, when the UE triggers the resource selection or the resource reselection or when the higher layer triggers the physical layer to report the candidate resource set, the slot t3-P1 has not been sensed. The UE reports the candidate resource set in slot m. The slot m is greater than or equal to the determined last sensing slot t3-P1 and less than or equal to the determined first one of the at least one selected slot t1. Exemplarily, the slot m is slot $t1-T_{proc,0}$ or the slot $t1-T_{proc,1}$ The UE continues sensing in the sensing slots t3-P1 greater than or equal to the slot n and less than or equal to the slot m.

Alternatively, a timer is introduced, and the UE starts the timer at a second moment. The second moment is any one of any one of the moment to trigger the resource selection, the moment to trigger the resource reselection, or the moment when the high layer triggers the physical layer to report the candidate resource set. In response to the timer reaching a set moment (e.g., 0), the UE performs any one of the following operations: triggering the determination of the candidate resource set, determining the candidate resource set, or reporting the candidate resource set to the high layer by the physical layer. The setting of the timer ensures that the moment when the physical layer reports the candidate resource set or the UE determines the candidate resource set or the UE triggers the determination of the candidate resource set is greater than or equal to the last one of the at least one sensing slot determined by the UE and/or less than or equal to the first one of the at least one selected slot determined by the UE.

In this embodiment, by controlling the target moment (such as the moment when the physical layer reports the candidate resource set or the UE determines the candidate resource set or the UE triggers the determination of the candidate resource set), the target moment is after the last one of the at least one sensing slot and/or before the first one of the at least one selected slot, which can ensure that when the resource exclusion is performed on the available resources in the at least one selected slot to construct the candidate resource set for data transmission, there would be no slot not having been sensed, thereby ensuring the accuracy and reliability of the resource selection.

In an exemplary embodiment, the above operation 620 may include the following four sub-operations.

1. For any available resource in the at least one selected slot, if the first sidelink control information transmitted in the PSCCH is sensed in the target sensing slot, the channel quality of the PSCCH or the PSSCH scheduled by the PSCCH is measured.

The first sidelink control information is carried in the PSCCH and includes the domain related to resource sensing, so as to facilitate resource exclusion and resource selection by other UEs after decoding. The channel quality may be RSRP of the SL, Reference Signal Receiving Quality (RSRQ) of the SL, or Signal to Interference plus Noise Ratio (SINR), or the like, which are not limited herein.

Alternatively, whether the measured channel quality of the PSCCH or the channel quality of the PSSCH scheduled by the PSCCH is used by the UE for comparison with the channel quality threshold depends on the resource pool configuration of the resource pool used by the UE. The resource pool configuration can be configured by the network or pre-configured.

2. Q slots are determined according to the target sensing slot and a resource reservation period carried in the first sidelink control information in response to the measured channel quality being greater than the channel quality threshold and the resource pool used by the UE enabling a resource reservation between TB s. Q is a positive integer.

Alternatively, the UE determines Q slots after the target sensing slot with the resource reservation period carried in the first sidelink control information as an interval. For example, a first slot of the Q slots is the target sensing slot plus the resource reservation period, a second slot of the Q slots is the target sensing slot plus 2*resource reservation period, and so on.

3. The available resource is excluded from the at least one selected slot in response to that a time-frequency resource indicated by time resource assignment fields and frequency resource assignment fields in the first sidelink control information received in the target sensing slot and in Q pieces of the first sidelink control information assumed to be received in the Q slots overlaps with the available resource or periodic resources corresponding to the available resource.

The UE takes the available resources in the determined at least one selected slot as a resource set A, and any one available resource in the resource set A is denoted as R(x,y). X and y indicate a position of the resource in the frequency domain and a position of the resource in the time domain, respectively. An initial number of resources in the resource set A is $M_{total}$.

If the measured channel quality is greater than the channel quality threshold and the resource pool used by the UE activates the resource reservation between TBs, the UE determines Q slots. It is assumed that the UE receives the first sidelink control information having the same content in the Q slots. The UE determines whether the time-frequency resource indicated by the time-frequency resource indication domain (which includes "Time resource assignment" fields and "Frequency resource assignment" fields) in the first sidelink control information received in the target sensing slot and in Q pieces of the first sidelink control information assumed to be received in the Q slots overlaps with the available resource R(x,y) or the periodic resources corresponding to the available resource R(x,y). If there is an overlap, the corresponding resource R(x,y) is excluded from the at least one selected slot. Alternatively, if there is no overlap, the available resource R(x,y) is reserved.

4. The candidate resource set is obtained based on an exclusion result of the available resource in the at least one selected slot, and the transmission resource is selected from the candidate resource set.

Alternatively, the physical layer obtains the candidate resource set based on the exclusion result of the available resource in the at least one selected slot, and the physical layer reports the candidate resource set to the higher layer. The higher layer randomly selects transmission resources from the candidate resource set to send data.

In one example, Q is equal to 1.

In another example, Q=⌈Tscal/Prx⌉. ⌈ ⌉ represents rounding up, Prx represents the resource reservation period carried in the first sidelink control information, and Tscal is any one of the following (1) to (9).

(1) A value in millisecond converted from a difference between an ending moment of the resource selection window and the target moment.
(2) A residual delay budget of service.
(3) A value in millisecond converted from the residual delay budget of the service.
(4) A value in millisecond converted from a difference between a last one of the at least one selected slot and a second moment. The second moment is any one of the moment to trigger the resource selection, the moment to trigger the resource reselection, or the moment when the high layer triggers the physical layer to report the candidate resource set. For example, t3-n in FIG. 7 or FIG. 8 is converted into milliseconds.
(5) A value in millisecond converted from a difference between the last one of the at least one selected slot and a third moment. The third moment is any one of the moment to trigger the determination of the candidate resource set, the moment when the candidate resource set is determined, or the moment when the physical layer reports the candidate resource set to the higher layer. For example, t3-m in FIG. 9 is converted into milliseconds.
(6) A value in millisecond converted from a difference between the last one of the at least one selected slot and a first one of the at least one selected slot.
(7) A value in millisecond converted from a difference between the last one of the at least one selected slot and a last one of the at least one sensing slot.
(8) A value in millisecond converted from a difference between an ending moment of the resource selection window and the last one of the at least one sensing slot.
(9) A number of the determined at least one selected slots.

In another example Q is equal to i, and i is a multiple of an interval between the target sensing slot and the at least one selected slot and the resource reservation period. This situation corresponds to the scheme of determining the target candidate slot as the at least one sensing slot in the embodiment described above. For the at least one sensing slot determined by this scheme, if the at least one sensing slot is determined by using the resource reservation period P, assuming that the resource reservation period in the first sidelink control information sensed in the at least one sensing slot is equal to P, Q is directly equal to i for determining the at least one sensing slot.

Alternatively, in response to that a first condition is met, Q=⌈Tscal/Prx⌉. The first condition includes at least one of the following.

(1) A fourth moment determined based on the target sensing slot is after the last one of the at least one sensing slot determined by the UE. The fourth moment is equal to a sum of the target sensing slot and Prx, or the fourth moment is equal to a sum of the target sensing slot and Prxlg. Prxlg is a number of logical slots converted from the Prx.
(2) Prx is less than Tscal.

The Prxlg which is the number of logical slots converted from the Prx mentioned above in (1) may be as follows: assuming that one slot is equal to 1 ms and Prx is 5 ms, 2 slots in the 5 slots may be downlink slots or slots for transmitting synchronization signals in the TDD mode, and these slots are not included in the resource pool of SL. Therefore, it is necessary to convert the 5 ms represented by Prx into 3 logical slots, i.e. Prxlg.

Alternatively, the operation 620 may also include the following sub-operations: in response to the measured channel quality being greater than the channel quality threshold and the resource pool used by the UE disenabling the resource reservation between the TB s, if the time-frequency resource indicated by the time resource assignment fields and frequency resource assignment fields in the first sidelink control information received in the target sensing slot overlaps with the available resource or the periodic resources corresponding to the available resource, the available resource is excluded from the at least one selected slot.

In response to the measured channel quality being greater than the channel quality threshold and the resource pool used by the UE disenabling the resource reservation between the TBs, the UE only determines whether the time-frequency resource indicated by the time-frequency resource indication domain (which includes the "Time resource assignment" fields and "Frequency resource assignment" fields) in the first sidelink control information received in the target sensing slot overlaps with the available resource $R(x,y)$ or the periodic resource corresponding to the available resource $R(x,y)$. If there is an overlap, the available resource $R(x,y)$ is excluded from the at least one selected slot. Alternatively, if there is no overlap, the available resource $R(x,y)$ is reserved.

Alternatively, in response to a number of remaining resources in the at least one selected slot after the resource exclusion being less than a threshold, the channel quality threshold is raised by a set value, and the measured channel quality is re-compared with the channel quality threshold. The resource exclusion is performed again on all available resources in the determined at least one selected slot. The remaining resources are determined as the candidate resource set until the number of the remaining resources is greater than or equal to the threshold. Alternatively, the threshold is determined based on a total number of available resources contained in the at least one selected slot. For example, the total number of available resources contained in the at least one selected slot is $M_{total}$, and the threshold is $M_{total}*X$ %. Alternatively, the possible values for X may be {20, 35, 50}. The resource pool configuration used by the UE includes the corresponding relationship between the priorities and the possible values. The UE determines the value of X according to the priority of the data to be sent and the corresponding relationship. The resource pool configuration may be configured by the network or pre-configured.

Figure 10:
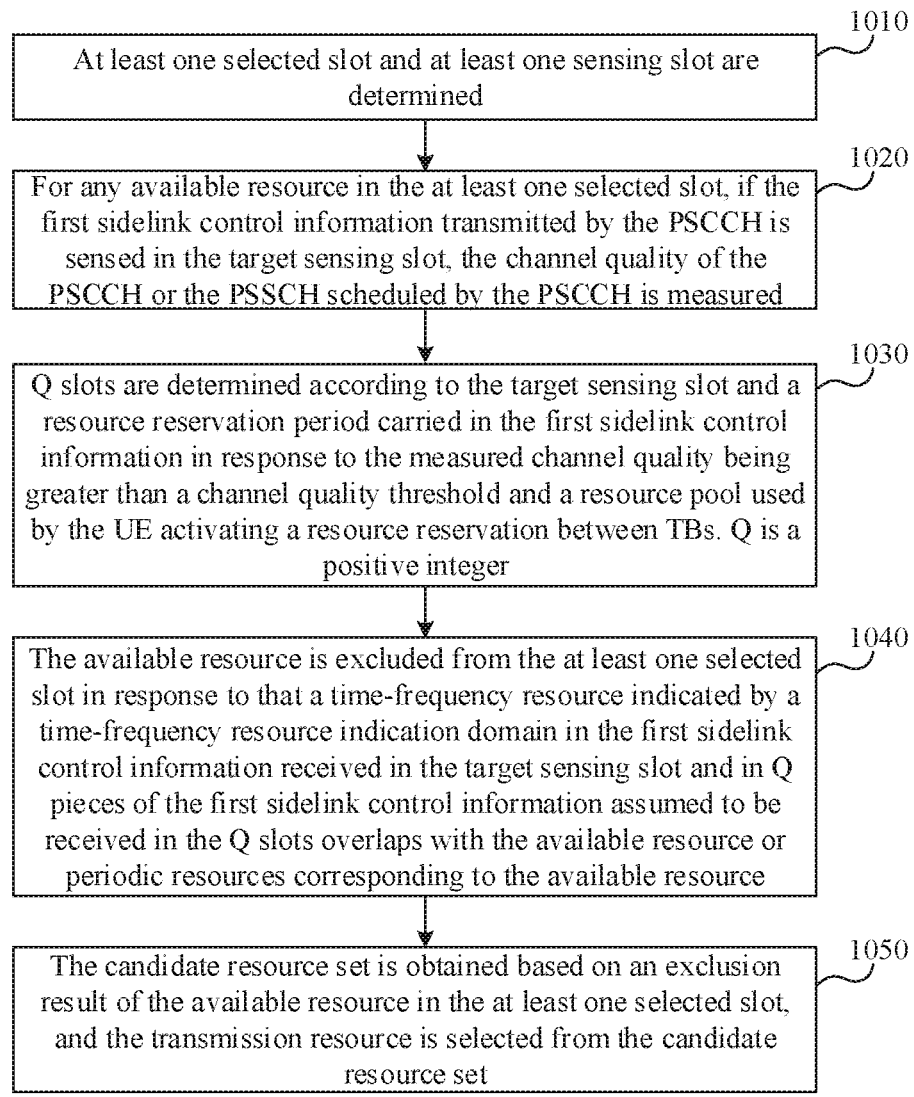
FIG. 10 is a flowchart of a resource selection method based on partial sensing according to another embodiment of the present disclosure.

With reference to FIG. 10, a flowchart of a resource selection method based on partial sensing according to another embodiment of the present disclosure is illustrated. The method may be applied to the network architecture illustrated in FIG. 1. For example, the method may be performed by a UE. The method includes the operations 1010 to 1050.

In operation 1010, at least one selected slot and at least one sensing slot are determined.

Alternatively, the at least one selected slot is after a target moment and the at least one sensing slot is before the target moment.

Alternatively, the number of the at least one selected slot determined above is greater than or equal to a number threshold. In one example, the number of the at least one selected slot determined above is greater than or equal to Y, and Y is greater than or equal to the number threshold. The number threshold is configured by the network device, or pre-configured, or predefined in the communication protocol, or determined by the UE itself.

Alternatively, in a case where the number of the determined at least one selected slot is multiple, the multiple selected slots are continuous or discontinuous.

In operation 1020, for any available resource in the at least one selected slot, if the first sidelink control information transmitted in the PSCCH is sensed in the target sensing slot, the channel quality of the PSCCH or the PSSCH scheduled by the PSCCH is measured.

In operation 1030, Q slots are determined according to the target sensing slot and a resource reservation period carried in the first sidelink control information in response to the measured channel quality being greater than a channel quality threshold and a resource pool used by the UE enabling a resource reservation between TBs. Q is a positive integer.

In one example, Q=1.

In another example, Q=⌈Tscal/Prx⌉. ⌈ ⌉ represents rounding up. Prx represents the resource reservation period carried in the first sidelink control information, and Tscal is any one of the following (1) to (9).
 (1) A value in millisecond converted from a difference between an ending moment of a resource selection window and the target moment.
 (2) A residual delay budget of service.
 (3) A value in millisecond converted from the residual delay budget of the service.
 (4) A value in millisecond converted from a difference between a last one of the at least one selected slot and a second moment. The second moment is any one of a moment to trigger a resource selection, a moment to trigger a resource reselection, or a moment when a high layer triggers a physical layer to report the candidate resource set.
 (5) A value in millisecond converted from a difference between the last one of the at least one selected slot and a third moment. The third moment is any one of a moment to trigger the determination of the candidate resource set, a moment when the candidate resource set is determined, or a moment when the physical layer reports the candidate resource set to the higher layer.
 (6) A value in millisecond converted from a difference between the last one of the at least one selected slot and a first one of the at least one selected slot.
 (7) A value in millisecond converted from a difference between the last one of the at least one selected slot and a last one of the at least one sensing slot.
 (8) A value in millisecond converted from a difference between an ending moment of the resource selection window and the last one of the at least one sensing slot.
 (9) A number of the determined at least one selected slots.

In another example Q=i, and i is a multiple of an interval between the target sensing slot and the at least one selected slot and the resource reservation period.

Alternatively, in response to that a first condition is met, Q=⌈Tscal/Prx⌉. The first condition includes at least one of the following.
 (1) A fourth moment determined based on the target sensing slot is after the last one of the at least one sensing slot determined by the UE. The fourth moment is equal to a sum of the target sensing slot and Prx, or the fourth moment is equal to a sum of the target sensing slot and Prxlg. Prxlg is a number of logical slots converted from the Prx.
 (2) Prx is less than Tscal.

In operation 1040, the available resource is excluded from the at least one selected slot in response to that a time-frequency resource indicated by time resource assignment fields and frequency resource assignment fields in the first sidelink control information received in the target sensing slot and in Q pieces of the first sidelink control information assumed to be received in the Q slots overlaps with the available resource or periodic resources corresponding to the available resource.

In operation 1050, the candidate resource set is obtained based on an exclusion result of the available resource in the at least one selected slot, and the transmission resource is selected from the candidate resource set.

Alternatively, the method of the embodiments further includes the following operations: in response to the measured channel quality being greater than the channel quality threshold and the resource pool used by the UE disenabling the resource reservation between the TB s, if the time-frequency resource indicated by the time resource assignment fields and frequency resource assignment fields in the first sidelink control information received in the target sensing slot overlaps with the available resource or the periodic resources corresponding to the available resource, the available resource is excluded from the at least one selected slot.

Alternatively, in response to a number of remaining resources in the at least one selected slot after the resource exclusion being less than a threshold, the channel quality threshold is raised by a set value, and the measured channel quality is re-compared with the channel quality threshold. The resource exclusion is performed again on all available resources in the determined at least one selected slot. The remaining resources are determined as the candidate resource set until the number of the remaining resources is greater than or equal to the threshold.

For details not described in detail in the present embodiments, reference is made to the description in the above embodiments and would not be repeated herein.

The following is an embodiment of the device of the present disclosure, which is configured to perform the method embodiments of the present disclosure. For details not disclosed in the device embodiments of the present disclosure, reference can be made to the method embodiments of the present disclosure.

Figure 11:
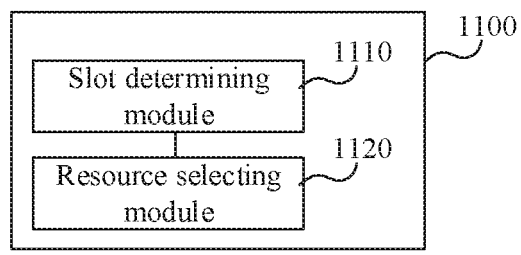
FIG. 11 is a block diagram of a resource selection device based on partial sensing according to an embodiment of the present disclosure.

With reference to FIG. 11, a block diagram of a resource selection device based on partial sensing according to an embodiment of the present disclosure is illustrated. The device has functions of implementing the above method embodiments, and the functions can be implemented by hardware or by execution of corresponding software by hardware. The device may be the UE described above, or may be arranged in the UE. As illustrated in FIG. 11 the device 1100 includes a slot determining module 1110 and a resource selecting module 1120.

The slot determining module 1110 is configured to determine at least one selected slot and at least one sensing slot. The at least one selected slot is after a target moment and the at least one sensing slot is before the target moment.

The resource selecting module 1120 is configured to determine a candidate resource set from available resources in the at least one selected slot based on a sensing result in the at least one sensing slot, and select a transmission resource from the candidate resource set.

In an exemplary embodiment, the target moment is any of: a moment to trigger a resource selection, a moment to trigger a resource reselection, a moment when a high layer triggers a physical layer to report the candidate resource set, a moment to trigger the determination of the candidate resource set, a moment when the candidate resource set is determined, or a moment when the physical layer reports the candidate resource set to the higher layer.

In an exemplary embodiment, the slot determining module 1110 is configured to: determine the at least one selected slot from a resource selection window, and for any one of the at least one selected slot, determine a target candidate slot corresponding to the selected slot as one of the at least one sensing slot. The target candidate slot is before a first moment, an interval between the target candidate slot and the selected slot is an integer multiple of a resource reservation period, and the first moment is determined based on the target moment.

Alternatively, the interval between the target candidate slot and the at least one selected slot is i times the resource reservation period, and i is a smallest positive integer to make the target candidate slot to be before the first moment.

Alternatively, the first moment is the target moment, or the first moment is the target moment minus a first offset.

Alternatively, the first offset is determined from multiple candidate offsets based on a subcarrier interval.

In an exemplary embodiment, the slot determining module 1110 is configured to: determine a maximum threshold of the at least one selected slot based on the target moment, and determine the at least one selected slot from a resource selection window based on the maximum threshold. The at least one selected slot is before the maximum threshold. The slot determining module 1110 is also configured to determine the at least one sensing slot based on the at least one selected slot and a resource reservation period.

Alternatively, the slot determining module 1110 is configured to add the target moment and a second offset to obtain the maximum threshold of the at least one selected slot.

Alternatively, the second offset is determined based on a minimum value in a resource reservation period set in a resource pool configuration. Alternatively, the second offset is determined based on a minimum value of resource reservation periods in a resource pool used by a UE. Alternatively, the second offset is configured by a network device, or the second offset is pre-configured.

Alternatively, the slot determining module 1110 is configured to subtract an integer multiple of the resource reservation period from the at least one selected slot to obtain the at least one sensing slot.

In an exemplary embodiment, the slot determining module 1110 is configured to: determine the at least one selected slot from a resource selection window, and determine the at least one sensing slot based on the at least one selected slot and a resource reservation period. The position of the target moment includes at least one of being after a last one of the at least one sensing slot or being before a first one of the at least one selected slot.

Alternatively, the target moment is the first one of the at least one selected slot minus a third offset.

Alternatively, the third offset is determined from multiple candidate offsets based on a subcarrier interval.

Figure 12:
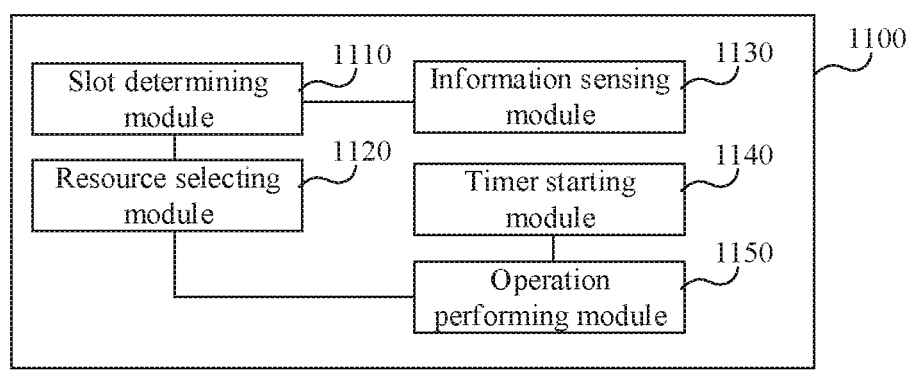
FIG. 12 is a block diagram of a resource selection device based on partial sensing according to another embodiment of the present disclosure.

Alternatively, as illustrated in FIG. 12, the device 1100 further includes an information sensing module 1130.

The information sensing module 1130 is configured to continue sensing in the determined sensing slot between a second moment and a third moment. The second moment is any one of a moment to trigger a resource selection, a moment to trigger a resource reselection, or a moment when a high layer triggers a physical layer to report the candidate resource set, and the third moment is any one of a moment to trigger the determination of the candidate resource set, a moment when the candidate resource set is determined, or a moment when the physical layer reports the candidate resource set to the higher layer.

Alternatively, as illustrated in FIG. 12, the device 1110 further includes a timer starting module 1140 and an operation performing module 1150.

The timer starting module 1140 is configured to start a timer at a second moment, where the second moment is any one of a moment to trigger a resource selection, a moment to trigger a resource reselection, or a moment when a high layer triggers a physical layer to report the candidate resource set.

The operation performing module 1150 is configured to perform, in response to the timer reaching a set moment, any one of following operations: triggering the determination of the candidate resource set, determining the candidate resource set, or reporting the candidate resource set to the high layer by the physical layer.

In an exemplary embodiment, a number of the at least one selected slot is greater than or equal to a number threshold. The number threshold is configured by a network device, or pre-configured, or predefined in a communication protocol, or determined by the UE itself.

In an exemplary embodiment, the at least one selected slot is continuous or discontinuous.

In an exemplary embodiment, the resource selecting module 1120 is configured to perform the following four operations.

For any available resource in the at least one selected slot, the resource selecting module 1120 is configured to measure a channel quality of a PSCCH or a PSSCH scheduled by the PSCCH in response to sensing first sidelink control information transmitted by the PSCCH in a target sensing slot.

The resource selecting module 1120 is configured to determine Q slots according to the target sensing slot and a resource reservation period carried in the first sidelink control information in response to the measured channel quality being greater than a channel quality threshold and a resource pool used by the UE enabling a resource reservation between TBs. Q is a positive integer.

The resource selecting module 1120 is configured to exclude the available resource from the at least one selected slot in response to that a time-frequency resource indicated by time resource assignment fields and frequency resource assignment fields in the first sidelink control information received in the target sensing slot and in Q pieces of the first sidelink control information assumed to be received in the Q slots overlaps with the available resource or periodic resources corresponding to the available resource.

The resource selecting module 1120 is configured to obtain the candidate resource set based on an exclusion result of the available resource in the at least one selected slot, and select the transmission resource from the candidate resource set.

Alternatively, Q=1.

Alternatively, Q=⌈Tscal/Prx⌉. ⌈ ⌉ represents rounding up. Prx represents the resource reservation period carried in the first sidelink control information, and Tscal is any one of a value in millisecond converted from a difference between an ending moment of the resource selection window and the target moment, a residual delay budget of service, a value in millisecond converted from the residual delay budget of the service, a value in millisecond converted from a difference between a last one of the at least one selected slot and a second moment, a value in millisecond converted from a difference between the last one of the at least one selected slot and a third moment, a value in millisecond converted from a difference between the last one of the at least one selected slot and a first one of the at least one selected slot, a value in millisecond converted from a difference between the last one of the at least one selected slot and a last one of the at least one sensing slot, a value in millisecond converted from a difference between a ending moment of the resource selection window and the last one of the at least one sensing slot, or a number of the determined at least one selected slots. The second moment is any one of a moment to trigger a resource selection, a moment to trigger a resource reselection, or a moment when a high layer triggers a physical layer to report the candidate resource set, and the third moment is any one of a moment to trigger the determination of the candidate resource set, a moment when the candidate resource set is determined, or a moment when the physical layer reports the candidate resource set to the higher layer.

Alternatively, Q=i, and the i is a multiple of an interval between the target sensing slot and the at least one selected slot and the resource reservation period.

Alternatively, Q=[Tscal/Prx] in response to that a first condition is met. The first condition includes at least one of followings.

A fourth moment determined based on the target sensing slot is after the last one of the at least one sensing slot determined by the UE. The fourth moment is equal to a sum of the target sensing slot and Prx or the fourth moment is equal to a sum of the target sensing slot and Prxlg. Prxlg is a number of logical slots converted from the Prx.

Prx is less than Tscal.

Alternatively, in response to the measured channel quality being greater than the channel quality threshold and the resource pool used by the UE disenabling the resource reservation between the TB s, if the time-frequency resource indicated by the time resource assignment fields and frequency resource assignment fields in the first sidelink control information received in the target sensing slot overlaps with the available resource or the periodic resources corresponding to the available resource, the resource selecting module 1120 is further configured to exclude the available resource from the at least one selected slot.

Alternatively, in response to a number of remaining resources in the at least one selected slot after resource exclusion being less than a threshold, the resource selecting module 1120 is further configured to raise the channel quality threshold by a set value, and re-compare the measured channel quality with the channel quality threshold, perform the resource exclusion again on all available resources in the determined at least one selected slot, and determine the remaining resources as the candidate resource set until the number of the remaining resources is greater than or equal to the threshold. The threshold is determined based on a total number of available resources contained in the at least one selected slot.

It should be noted that, when the device provided by the embodiments implements its function, the division of the functional modules described above is only used an example. In practical application, the above functions can be implemented by assigning the functions to different functional modules according to actual needs. That is, the content structure of the device can be divided into different functional modules to complete all or part of the functions described above.

With regard to the device in the above embodiments, the specific manner in which the various modules perform the operations has been described in detail in the embodiments relating to the methods and would not be explained in detail herein.

Figure 13:
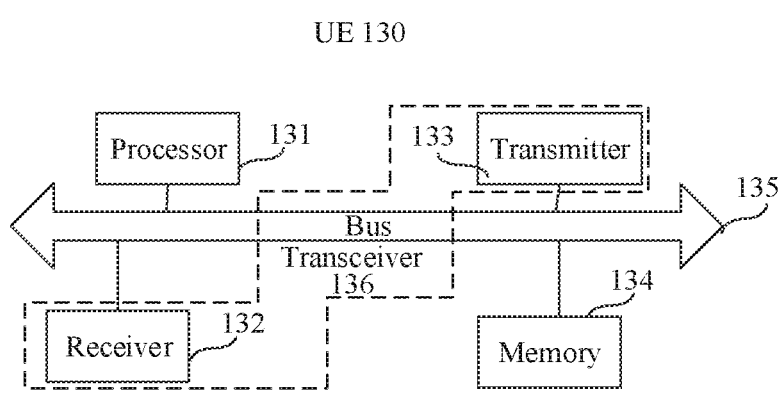
FIG. 13 is a structural diagram of a UE according to an embodiment of the present disclosure.

With reference to FIG. 13, a structural diagram of a UE according to the embodiments of the present disclosure is illustrated. For example, the UE may be configured to perform the resource selection method based on partial sensing described above. Specifically, the UE 130 includes a processor 131, a receiver 132, a transmitter 133, a memory 134 and a bus 135.

The processor 131 includes one or more processing cores and performs various functional applications and information processing by running software programs and modules.

The receiver 132 and the transmitter 133 may be implemented as a transceiver 136. The transceiver 136 may be a communication chip.

The memory 134 is connected to the processor 131 through the bus 135.

The memory 134 may be configured to store a computer program and the processor 131 may be configured to execute the computer program to implement the various operations performed by the UE in the method embodiments described above.

Furthermore, the memory 134 may be implemented by any type of volatile or non-volatile storage devices or a combination thereof. The volatile or non-volatile storage devices may include, but are not limited to: a Random Access Memory (RAM) and a Read-Only Memory (ROM), an Erasable Programmable Read-Only Memory (EPROM), an Electrically Erasable Programmable Read-Only Memory (EEPROM), a flash memory or other solid-state storage technology, a Compact Disc Read-Only Memory (CD-ROM), a Digital Video Disc (DVD) or other optical storages, a magnetic tape cassette, a magnetic tape, a magnetic disk storage or other magnetic storage devices.

The processor 131 is configured to determine at least one selected slot and at least one sensing slot. The at least one selected slot is after a target moment and the at least one sensing slot is before the target moment.

The processor 131 is further configured to determine a candidate resource set from available resources in the at least one selected slot based on a sensing result in the at least one sensing slot, and select a transmission resource from the candidate resource set.

In an exemplary embodiment, the target moment is any of: a moment to trigger a resource selection, a moment to trigger a resource reselection, a moment when a high layer triggers a physical layer to report the candidate resource set, a moment to trigger the determination of the candidate resource set, a moment when the candidate resource set is determined, or a moment when the physical layer reports the candidate resource set to the higher layer.

In an exemplary embodiment, the processor 131 is configured to: determine the at least one selected slot from a resource selection window, and for any one of the at least one selected slot, determine a target candidate slot corresponding to the selected slot as one of the at least one sensing slot. The target candidate slot is before a first moment, an interval between the target candidate slot and the selected slot is an integer multiple of a resource reservation period, and the first moment is determined based on the target moment.

Alternatively, the interval between the target candidate slot and the selected slot is i times the resource reservation period, and i is a smallest positive integer to make the target candidate slot to be before the first moment.

Alternatively, the first moment is the target moment, or the first moment is the target moment minus a first offset.

Alternatively, the first offset is determined from multiple candidate offsets based on a subcarrier interval.

In an exemplary embodiment, the processor 131 is configured to: determine a maximum threshold of the at least one selected slot based on the target moment, and determine the at least one selected slot from a resource selection window based on the maximum threshold. The at least one selected slot is before the maximum threshold. The processor 131 is also configured to determine the at least one sensing slot based on the at least one selected slot and a resource reservation period.

Alternatively, the processor 131 is configured to add the target moment and a second offset to obtain the maximum threshold of the at least one selected slot.

Alternatively, the second offset is determined based on a minimum value in a resource reservation period set in a resource pool configuration. Alternatively, the second offset is determined based on a minimum value of resource reservation periods in a resource pool used by a UE. Alternatively, the second offset is configured by a network device, or the second offset is pre-configured.

Alternatively, the processor 131 is configured to subtract an integer multiple of the resource reservation period from the at least one selected slot to obtain the at least one sensing slot.

In an exemplary embodiment, the processor 131 is configured to: determine the at least one selected slot from a resource selection window, and determine the at least one sensing slot based on the at least one selected slot and a resource reservation period. The position of the target moment includes at least one of being after a last one of the at least one sensing slot or being before a first one of the at least one selected slot.

Alternatively, the target moment is the first one of the at least one selected slot minus a third offset.

Alternatively, the third offset is determined from multiple candidate offsets based on a subcarrier interval.

Alternatively, the processor 131 is also configured to continue sensing in the determined at least one sensing slot between a second moment and a third moment. The second moment is any one of a moment to trigger a resource selection, a moment to trigger a resource reselection, or a moment when a high layer triggers a physical layer to report the candidate resource set, and the third moment is any one of a moment to trigger the determination of the candidate resource set, a moment when the candidate resource set is determined, or a moment when the physical layer reports the candidate resource set to the higher layer.

Alternatively, the processor 131 is also configured to start a timer at a second moment. The second moment is any one of a moment to trigger a resource selection, a moment to trigger a resource reselection, or a moment when a high layer triggers a physical layer to report the candidate resource set.

The processor 131 is further configured to perform, in response to the timer reaching a set moment, any one of following operations: triggering the determination of the candidate resource set, determining the candidate resource set, or reporting the candidate resource set to the high layer by the physical layer.

In an exemplary embodiment, a number of the at least one selected slot is greater than or equal to a number threshold. The number threshold is configured by a network device, or pre-configured, or predefined in a communication protocol, or determined by the UE itself.

In an exemplary embodiment, the at least one selected slot is continuous or discontinuous.

In an exemplary embodiment, the processor 131 is configured to perform the following four operations.

For any available resource in the at least one selected slot, the processor 131 is configured to measure a channel quality of a PSCCH or a PSSCH scheduled by the PSCCH in response to sensing first sidelink control information transmitted by the PSCCH in a target sensing slot.

The processor 131 is configured to determine Q slots according to the target sensing slot and a resource reservation period carried in the first sidelink control information in response to the measured channel quality being greater than a channel quality threshold and a resource pool used by the UE enabling a resource reservation between TBs. Q is a positive integer.

The processor 131 is configured to exclude the available resource from the at least one selected slot in response to that a time-frequency resource indicated by time resource assignment fields and frequency resource assignment fields in the first sidelink control information received in the target sensing slot and in Q pieces of the first sidelink control information assumed to be received in the Q slots overlaps with the available resource or periodic resources corresponding to the available resource.

The processor 131 is configured to obtain the candidate resource set based on an exclusion result of the available resource in the at least one selected slot, and select the transmission resource from the candidate resource set.

Alternatively, Q=1.

Alternatively, Q=⌈Tscal/Prx⌉. ⌈ ⌉ represents rounding up. Prx represents the resource reservation period carried in the first sidelink control information, and Tscal is any one of a value in millisecond converted from a difference between an ending moment of the resource selection window and the target moment, a residual delay budget of service, a value in millisecond converted from the residual delay budget of the service, a value in millisecond converted from a difference between a last one of the at least one selected slot and a second moment, a value in millisecond converted from a difference between the last one of the at least one selected slot and a third moment, a value in millisecond converted from a difference between the last one of the at least one selected slot and a first one of the at least one selected slot, a value in millisecond converted from a difference between the last one of the at least one selected slot and a last one of the at least one sensing slot, a value in millisecond converted from a difference between a ending moment of the resource selection window and the last one of the at least one sensing slot, or a number of the determined at least one selected slots. The second moment is any one of a moment to trigger a resource selection, a moment to trigger a resource reselection, or a moment when a high layer triggers a physical layer to report the candidate resource set, and the third moment is any one of a moment to trigger the determination of the candidate resource set, a moment when the candidate resource set is determined, or a moment when the physical layer reports the candidate resource set to the higher layer.

Alternatively, Q=i, and the i is a multiple of an interval between the target sensing slot and the at least one selected slot and the resource reservation period.

Alternatively, Q=[Tscal/Prx] in response to that a first condition is met. The first condition includes at least one of followings.

A fourth moment determined based on the target sensing slot is after the last one of the at least one sensing slot determined by the UE. The fourth moment is equal to a sum of the target sensing slot and Prx or the fourth moment is equal to a sum of the target sensing slot and Prxlg. Prxlg is a number of logical slots converted from the Prx.

Prx is less than Tscal.

Alternatively, in response to the measured channel quality being greater than the channel quality threshold and the resource pool used by the UE disenabling the resource reservation between the TB s, if the time-frequency resource indicated by the time resource assignment fields and frequency resource assignment fields in the first sidelink control information received in the target sensing slot overlaps with the available resource or the periodic resources corresponding to the available resource, the processor 131 is further configured to exclude the available resource from the at least one selected slot.

Alternatively, in response to a number of remaining resources in the at least one selected slot after resource exclusion being less than a threshold, the processor 131 is further configured to raise the channel quality threshold by a set value, and re-compare the measured channel quality with the channel quality threshold, perform the resource exclusion again on all available resources in the determined at least one selected slot, and determine the remaining resources as the candidate resource set until the number of the remaining resources is greater than or equal to the threshold. The threshold is determined based on a total number of available resources contained in the at least one selected slot.

Embodiments of the disclosure also provide a computer-readable storage medium having stored thereon a computer program that, when executed by a processor, causes the processor to implement the resource selection method based on partial sensing.

Alternatively, the computer-readable storage medium may include a ROM, a RAM, a Solid State Drives (SSD), an optical disk, and the like. The RAM includes a Resistive Random Access Memory (ReRAM) and a Dynamic Random Access Memory (DRAM).

Embodiments of the disclosure also provide a chip including at least one of a programmable logic circuitry or program instructions. When the chip runs on the UE, the chip is configured to implement the above-mentioned resource selection method based on partial sensing.

Embodiments of the disclosure also provide a computer program product or a computer program. The computer program product or computer program includes computer instructions stored in a computer-readable storage medium, a processor reads and executes the computer instructions from the computer-readable storage medium to implement the above-mentioned resource selection method based on partial sensing.

It should be understood that the expression "indication" in the embodiments of the present disclosure may be a direct indication, may be an indirect indication, or may represent an associated relationship. For example, A indicating B can mean that A directly indicates B (e.g., B can be obtained through A); it can also mean that A indirectly indicates B (e.g., A indicates C, and B can be obtained by C); and it can also indicate that there is an association between A and B.

In the description of the embodiments of the present disclosure, the term "corresponding" may mean that there is a direct correspondence or an indirect correspondence between the two, may also mean that there is an association relationship between the two, may also be a relationship of indicating and being indicated, configuring and being configured, etc.

The term "multiple" in the present disclosure may be two or more. The term "and/or" describes the association relationship between associated objects, and means that there can be three kinds of relationships. For example, A and/or B, can mean that there are three situations. That is, only A exists, A and B exist at the same time, and only B exists. The character "/" generally indicates that the related objects are of an "or" relationship.

In addition, the numbers of the operations described in the present disclosure only represents a possible sequence of implementation between the operations by example, and in some other embodiments, the above-mentioned operations may also be performed not in the sequence. For example, two differently numbered operations are performed simultaneously, or two differently numbered operations are performed in a sequence reverse to the illustration, which is not limited in the embodiments of the present disclosure.

Those skilled in the art will appreciate that, in one or more of the above examples, the functions described in the embodiments of the present disclosure may be implemented in hardware, software, firmware or any combination thereof. When the functions are implemented in software, these functions may be stored in a computer-readable medium or transmitted as one or more instructions or codes on the computer-readable medium. The computer-readable medium includes a computer storage medium and a communication medium. The communication medium includes any medium that facilitates the transfer of computer programs from one place to another place. The storage medium may be any available medium accessible to a general-purpose or special-purpose computer.

The above descriptions are only exemplary embodiments of the present disclosure and are not intended to limit the present disclosure. Any modification, equivalent replacement, improvement or the like made within the spirit and principles of the present disclosure shall be included in the scope of protection of the present disclosure.

The invention claimed is:

1. A resource selection method based on partial sensing, performed by a User Equipment (UE), the method comprising:
    determining at least one selected slot and at least one sensing slot, wherein the at least one selected slot is after a target slot, and the at least one sensing slot is before the target slot; and
    determining a candidate resource set from available resources in the at least one selected slot based on a sensing result in the at least one sensing slot, and selecting a transmission resource from the candidate resource set,
    wherein the target slot is a first one of the at least one selected slot minus a third offset, and the third offset is determined based on a subcarrier interval.

2. The method of claim 1, wherein determining the at least one selected slot and the at least one sensing slot comprises:
    determining the at least one selected slot from a resource selection window; and
    for any one of the at least one selected slot, determining a target candidate slot corresponding to the selected slot as one of the at least one sensing slot, wherein the target candidate slot is before the target slot, an interval between the target candidate slot and the selected slot is an integer multiple of a resource reservation period.

3. The method of claim 2, wherein the interval between the target candidate slot and the selected slot is i times the resource reservation period, and i is a smallest positive integer to make the target candidate slot to be before the target slot.

4. The method of claim 1, wherein determining the at least one selected slot and the at least one sensing slot comprises:
   determining the at least one selected slot from a resource selection window; and
   determining, based on the at least one selected slot and a resource reservation period, the at least one sensing slot,
   wherein position of the target slot is after a last one of the at least one sensing slot and before the first one of the at least one selected slot.

5. The method of claim 4, further comprising:
   continuing sensing in the determined at least one sensing slot between a second moment and a third moment,
   wherein the second moment is any one of: a moment to trigger a resource selection, a moment to trigger a resource reselection, or a moment when a high layer triggers a physical layer to report the candidate resource set; and
   the third moment is a moment when the physical layer reports the candidate resource set to the higher layer.

6. The method of claim 1, wherein a number of the at least one selected slot is greater than or equal to a number threshold, wherein the number threshold is configured by a network device, or pre-configured.

7. The method of claim 1, wherein determining the candidate resource set from the available resources in the at least one selected slot based on the sensing result in the at least one sensing slot, and selecting the transmission resource from the candidate resource set comprises:
   for any available resource in the at least one selected slot, measuring a channel quality of a Physical Sidelink Control Channel (PSCCH) or a Physical Sidelink Shared Channel (PSSCH) scheduled by the PSCCH in response to sensing first sidelink control information transmitted by the PSCCH in a target sensing slot;
   determining Q slots according to the target sensing slot and a resource reservation period carried in the first sidelink control information in response to the measured channel quality being greater than a channel quality threshold and a resource pool used by the UE enabling a resource reservation between transmission blocks (TBs), wherein Q is a positive integer;
   excluding the available resource from the at least one selected slot in response to that a time-frequency resource indicated by time resource assignment fields and frequency resource assignment fields in the first sidelink control information received in the target sensing slot and in Q pieces of the first sidelink control information assumed to be received in the Q slots overlaps with the available resource or periodic resources corresponding to the available resource; and
   obtaining the candidate resource set based on an exclusion result of the available resource in the at least one selected slot, and selecting the transmission resource from the candidate resource set.

8. The method of claim 7, wherein Q=1, or
   wherein Q=⌈Tscal/Prx⌉, ⌈ ⌉ represents rounding up, Prx represents the resource reservation period carried in the first sidelink control information, and Tscal is a value in millisecond converted from a difference between a last one of the at least one selected slot and a third moment, the third moment being a first one of the at least one selected slot minus $T_{proc,1}$.

9. The method of claim 8, wherein in response to that a first condition is met, Q=⌈Tscal/Prx⌉,
   wherein the first condition comprises at least one of followings:
   a fourth moment determined based on the target sensing slot being after the last one of the at least one sensing slot determined by the UE, wherein the fourth moment is equal to a sum of the target sensing slot and Prxlg, wherein Prxlg is a number of logical slots converted from the Prx, or
   Prx being less than Tscal.

10. A User Equipment (UE) comprising:
    a processor,
    wherein the processor is configured to:
    determine at least one selected slot and at least one sensing slot, wherein the at least one selected slot is after a target slot and the at least one sensing slot is before the target slot; and
    determine a candidate resource set from available resources in the at least one selected slot based on a sensing result in the at least one sensing slot, and select a transmission resource from the candidate resource set,
    wherein the target slot is a first one of the at least one selected slot minus a third offset, and the third offset is determined based on a subcarrier interval.

11. The UE of claim 10, wherein the processor is further configured to:
    determine the at least one selected slot from a resource selection window; and
    for any one of the at least one selected slot, determine a target candidate slot corresponding to the selected slot as one of the at least one sensing slot, wherein the target candidate slot is before the target slot, an interval between the target candidate slot and the selected slot is an integer multiple of a resource reservation period.

12. The UE of claim 11, wherein the interval between the target candidate slot and the selected slot is i times the resource reservation period, and i is a smallest positive integer to make the target candidate slot to be before the target slot.

13. The UE of claim 10, wherein the processor is further configured to:
    determine the at least one selected slot from a resource selection window; and
    determine, based on the at least one selected slot and a resource reservation period, the at least one sensing slot,
    wherein position of the target slot is after a last one of the at least one sensing slot and before the first one of the at least one selected slot.

14. The UE of claim 13, wherein the processor is further configured to:
    continue sensing in the determined at least one sensing slot between a second moment and a third moment,
    wherein the second moment is any one of: a moment to trigger a resource selection, a moment to trigger a resource reselection, or a moment when a high layer triggers a physical layer to report the candidate resource set; and
    the third moment is a moment when the physical layer reports the candidate resource set to the higher layer.

15. The UE of claim 10, wherein a number of the at least one selected slot is greater than or equal to a number threshold, wherein the number threshold is configured by a network device, or pre-configured.

16. The UE of claim 10, wherein the processor is further configured to:
- for any available resource in the at least one selected slot, measure a channel quality of a Physical Sidelink Control Channel (PSCCH) or a Physical Sidelink Shared Channel (PSSCH) scheduled by the PSCCH in response to sensing first sidelink control information transmitted by the PSCCH in a target sensing slot;
- determine Q slots according to the target sensing slot and a resource reservation period carried in the first sidelink control information in response to the measured channel quality being greater than a channel quality threshold and a resource pool used by the UE enabling a resource reservation between transmission blocks (TBs), wherein Q is a positive integer;
- exclude the available resource from the at least one selected slot in response to that a time-frequency resource indicated by time resource assignment fields and frequency resource assignment fields in the first sidelink control information received in the target sensing slot and in Q pieces of the first sidelink control information assumed to be received in the Q slots overlaps with the available resource or periodic resources corresponding to the available resource; and
- obtain the candidate resource set based on an exclusion result of the available resource in the at least one selected slot, and select the transmission resource from the candidate resource set.

17. The UE of claim 16, wherein Q=1, or
wherein Q=⌈Tscal/Prx⌉, ⌈ ⌉ represents rounding up, Prx represents the resource reservation period carried in the first sidelink control information, and Tscal is a value in millisecond converted from a difference between a last one of the at least one selected slot and a third moment, the third moment being a first one of the at least one selected slot minus $T_{proc,1}$.

18. The UE of claim 17, wherein in response to that a first condition is met, Q=⌈Tscal/Prx⌉,
wherein the first condition comprises at least one of followings:
a fourth moment determined based on the target sensing slot being after the last one of the at least one sensing slot determined by the UE, wherein the fourth moment is equal to a sum of the target sensing slot and Prxlg, wherein Prxlg is a number of logical slots converted from the Prx, or
Prx being less than Tscal.

* * * * *